US012712265B2

(12) United States Patent
Pu et al.

(10) Patent No.: US 12,712,265 B2
(45) Date of Patent: Aug. 18, 2026

(54) COMMUNICATION APPARATUS AND METHOD

(71) Applicant: Yinwang Intelligent Technologies Co., Ltd., Shenzhen (CN)

(72) Inventors: Tao Pu, Shanghai (CN); Lihong Jiang, Shanghai (CN); Lan You, Shanghai (CN); Dingjiu Daojian, Dongguan (CN); Huafeng Zhang, Shanghai (CN); Jianping Li, Chengdu (CN)

(73) Assignee: Yinwang Intelligent Technologies Co., Ltd., Shenzhen (CN)

( * ) Notice: Subject to any disclaimer, the term of this patent is extended or adjusted under 35 U.S.C. 154(b) by 407 days.

(21) Appl. No.: 18/299,384

(22) Filed: Apr. 12, 2023

(65) Prior Publication Data

US 2023/0246332 A1 Aug. 3, 2023

Related U.S. Application Data

(63) Continuation of application No. PCT/CN2021/114704, filed on Aug. 26, 2021.

(30) Foreign Application Priority Data

Oct. 16, 2020 (CN) .......................... 202011112993.3

(51) Int. Cl.
*H01Q 5/28* (2015.01)
*G01S 7/282* (2006.01)
*H01Q 1/24* (2006.01)

(52) U.S. Cl.
CPC .............. *H01Q 5/28* (2015.01); *G01S 7/282* (2013.01); *H01Q 1/241* (2013.01)

(58) Field of Classification Search
CPC .......... H01Q 5/00; H01Q 15/00; H01Q 19/00; H01Q 21/00; H01Q 25/00; H01Q 3/36;
(Continued)

(56) References Cited

U.S. PATENT DOCUMENTS 10,924,343 B1 * 2/2021 Shukla .................. H04L 67/104
11,815,619 B1 * 11/2023 Shoemaker ............... G01S 7/03
(Continued)

FOREIGN PATENT DOCUMENTS

CN 109448145 A 3/2019
CN 111585644 A 8/2020

*Primary Examiner* — Resha Desai
*Assistant Examiner* — Peter Davon Doze
(74) *Attorney, Agent, or Firm* — WOMBLE BOND DICKINSON (US) LLP

(57) ABSTRACT

This application provides a communication apparatus. The communication apparatus includes at least one transmit antenna unit, at least one receive antenna unit, and a signal processing unit. The signal processing unit is configured to: control the at least one transmit antenna unit and the at least one receive antenna unit to communicate with at least one first terminal on a first frequency band; control at least one target transmit antenna unit to send a radar signal on a second frequency band; and control at least one target receive antenna unit to receive a first echo signal on the second frequency band. The at least one transmit antenna unit includes the at least one target transmit antenna unit. The at least one receive antenna unit includes the at least one target receive antenna unit. The first frequency band and the second frequency band do not overlap.

20 Claims, 12 Drawing Sheets

(58) Field of Classification Search
CPC .... H01Q 15/24; H01Q 15/246; H01Q 9/0428; G01S 2013/9316; G01S 7/025; G01S 7/026; G07B 15/063
See application file for complete search history.

(56) References Cited

U.S. PATENT DOCUMENTS

2009/0303004 A1* 12/2009 Tuttle ................. G06K 7/10366 340/10.1
2016/0180604 A1* 6/2016 Wilson ................. G07B 15/063 705/4
2017/0310758 A1* 10/2017 Davis .................... G01S 13/931
2020/0271772 A1* 8/2020 Wang .................... G01S 13/106
2020/0319327 A1 10/2020 Tsvelykh et al.
2021/0020012 A1* 1/2021 Shakedd .................. H04B 1/40

* cited by examiner

Frequency band 1
Frequency band 2
Frequency band 3
Frequency band 4
Frequency band 5

5725 5787.5 5802.5 5827.5 5842.5 5850

Unit: Megahertz (MHz)

COMMUNICATION APPARATUS AND METHOD

CROSS-REFERENCE TO RELATED APPLICATIONS

This application is a continuation of International Application No. PCT/CN2021/114704, filed on Aug. 26, 2021, which claims priority to Chinese Patent Application No. 202011112993.3, filed on Oct. 16, 2020. The disclosures of the aforementioned applications are hereby incorporated by reference in their entirety.

TECHNICAL FIELD

This application relates to the field of integrated sensing and communication technologies, and more specifically, to a communication apparatus and method in the field of integrated sensing and communication technologies.

BACKGROUND

With the development of urbanization, construction of transportation infrastructure is continuously improved. A network of roads, which are mainly highways, has covered the entire country. However, with the increase of traffic flow, vehicles often queue up at highway toll gates and traffic congestion occurs. As a result, the communication capability at such road sections decreases.

Electronic toll collection (ETC) means that a road side unit (RSU) installed on one side of an ETC lane and an on-board unit (OBU) on a vehicle communicate with each other to implement toll collection without stopping the vehicle. This greatly alleviates traffic congestion.

However, to improve operation efficiency and performance of the RSU, a radar apparatus with a strong sensing and detection capability is considered in a conventional technology to indicate the RSU to communicate with the OBU. In this case, an additional radar apparatus needs to be disposed for the RSU. Therefore, costs and overheads of an existing solution in which the RSU and the radar apparatus are combined are high.

SUMMARY

This application provides a communication apparatus and method, to help reduce costs and overheads.

According to a first aspect, an embodiment of this application provides a communication apparatus. The apparatus may include at least one transmit antenna unit, at least one receive antenna unit, and a signal processing unit. The signal processing unit is separately connected to the at least one transmit antenna unit and the at least one receive antenna unit. The signal processing unit is configured to control the at least one transmit antenna unit and the at least one receive antenna unit to communicate with at least one first terminal on a first frequency band. The signal processing unit is further configured to: control at least one target transmit antenna unit to send a radar signal on a second frequency band; and control at least one target receive antenna unit to receive a first echo signal of the radar signal on the second frequency band. The first echo signal includes an echo signal corresponding to at least one target. The at least one transmit antenna unit includes the at least one target transmit antenna unit. The at least one receive antenna unit includes the at least one target receive antenna unit. The first frequency band and the second frequency band do not overlap.

According to the communication apparatus provided in this embodiment of this application, receiving and sending of the radar signal and a communication signal can be implemented by using one set of transmit and receive antenna units. This can reduce costs and overheads.

In an embodiment, when a quantity of the at least one transmit antenna unit is greater than 1, the at least one transmit antenna unit may be referred to as a transmit antenna array. Similarly, when a quantity of the at least one receive antenna unit is greater than 1, the at least one receive antenna unit may be referred to as a receive antenna array.

In other words, when the quantity of the at least one transmit antenna unit is greater than 1, the communication apparatus may perform beamforming on the transmit antenna array to cover a plurality of lanes, to send a downlink communication signal to terminals in vehicles on the plurality of lanes. Similarly, the communication apparatus may perform beamforming on the receive antenna array to cover the plurality of lanes, to receive an uplink communication signal sent by the terminals in the vehicles on the plurality of lanes.

In this way, according to the communication apparatus provided in this embodiment of this application, only one communication apparatus needs to be deployed on the plurality of lanes, to implement receiving and sending of the radar signal and receiving and sending of the communication signal between the communication apparatus and the terminals in the vehicles on the plurality of lanes. This further reduces costs and overheads.

In an embodiment, the first frequency band includes a first subband and a second subband. The first subband and the second subband do not overlap. The signal processing unit is configured to: send a first communication signal to the at least one first terminal on the first subband by using the at least one transmit antenna unit; and receive a second communication signal from the at least one first terminal on the second subband by using the at least one receive antenna unit.

In an embodiment, the at least one target may include at least one second terminal. The at least one second terminal may include the at least one first terminal, or the at least one second terminal is partially or completely different from the at least one first terminal. This is not limited in this embodiment of this application.

It should be noted that the first communication signal and the second communication signal support a first communication protocol standard. In other words, the first communication signal and the second communication signal may be understood as signals transmitted when the communication apparatus communicates with the terminal in the first communication protocol standard.

It should be noted that, to implement receiving and sending of the communication signal between the communication apparatus and the terminal and further implement receiving and sending of the radar signal, the communication apparatus needs to operate on different frequency bands. Therefore, the first subband, the second subband, and the second frequency band do not overlap. In other words, the second frequency band may be another frequency band other than the first frequency band.

In an embodiment, a transmit antenna in the at least one transmit antenna unit may be an antenna of a plurality of polarization types. This is not limited in this embodiment of this application.

In an embodiment, one or more of the at least one transmit antenna unit may include at least one right-handed circular polarization antenna. In other words, both the first communication signal and the radar signal that are sent by the communication apparatus by using each transmit antenna unit are right-handed circular polarization signals.

In an embodiment, the communication apparatus may further include at least one transmit radio frequency unit and at least one transmit feed unit. The at least one transmit radio frequency unit, the at least one transmit feed unit, and the at least one transmit antenna unit correspond to each other. An output end of the signal processing unit is connected to an input end of the at least one transmit radio frequency unit. An output end of the at least one transmit radio frequency unit is connected to an input end of the at least one transmit feed unit. An output end of the at least one transmit feed unit is connected to the at least one transmit antenna unit.

It should be noted that, because a separate vertical polarization antenna or a separate horizontal polarization antenna serves as a receive antenna, a right-handed circular polarization signal and a left-handed circular polarization signal may be received at the same time, but only some signal energy may be lost.

In an embodiment, a receive antenna in the at least one target receive antenna unit may be an antenna of a plurality of polarization types. This is not limited in this embodiment of this application.

In an embodiment, one or more of the at least one target receive antenna unit may include at least one linear polarization antenna. For example, the at least one linear polarization antenna may include at least one horizontal polarization antenna and/or at least one vertical polarization antenna.

In another embodiment, one or more of the at least one target receive antenna unit may include at least one linear polarization antenna combination. The linear polarization antenna combination includes a pair of linear polarization antennas that are orthogonally polarized. For example, the linear polarization antenna combination includes a horizontal polarization antenna and a vertical polarization antenna. For another example, the linear polarization antenna combination includes a 45° linear polarization antenna and a −45° linear polarization antenna.

In still another embodiment, one or more of the at least one target receive antenna unit may include at least one linear polarization antenna and at least one linear polarization antenna combination. The linear polarization antenna combination includes a pair of linear polarization antennas that are orthogonally polarized.

In an embodiment, for example, each of the at least one target receive antenna unit includes a linear polarization antenna combination, and the linear polarization antenna combination includes a horizontal polarization antenna and a vertical polarization antenna. The apparatus further includes at least one receive radio frequency unit and at least one receive feed unit. The at least one target receive antenna unit, the at least one receive feed unit, and the at least one receive radio frequency unit correspond to each other. The at least one target receive antenna unit is connected to an input end of the at least one receive feed unit. An output end of the at least one receive feed unit is connected to an input end of the at least one receive radio frequency unit. An output end of the at least one receive radio frequency unit is connected to the signal processing unit.

In an embodiment, when each of the at least one target receive unit includes the at least one linear polarization antenna combination, and the linear polarization antenna combination includes the horizontal polarization antenna and the vertical polarization antenna, the receive feed unit is configured to: receive a horizontal polarization signal from a horizontal polarization antenna in the target receive antenna unit corresponding to the receive feed unit and a vertical polarization signal from a vertical polarization antenna in the target receive antenna unit corresponding to the receive feed unit; move a phase of the vertical polarization signal forward by 90 degrees relative to a phase of the horizontal polarization signal to obtain the first echo signal; move the phase of the horizontal polarization signal forward by 90 degrees relative to the phase of the vertical polarization signal to obtain the second communication signal; perform combination processing on the first echo signal and the second communication signal to obtain a combined signal; and send the combined signal to the receive radio frequency unit corresponding to the receive feed unit. The receive radio frequency unit corresponding to the receive feed unit is configured to receive the combined signal, and send the combined signal to the signal processing unit. The signal processing unit is configured to: receive the combined signal; obtain the second communication signal from the combined signal based on the second subband; and obtain the first echo signal from the combined signal based on the second frequency band.

In an embodiment, one receive feed unit is used as an example. The receive feed unit may include a first phase shifting unit, a second phase shifting unit, and a combining unit. A first input end of the first phase shifting unit is connected to the antenna horizontal polarization antenna in the linear polarization antenna combination corresponding to the receive feed unit. A second input end of the first phase shifting unit is connected to the vertical polarization antenna in the linear polarization antenna combination. An output end of the first phase shifting unit is connected to a first input end of the combining unit. A first input end of the second phase shifting unit is connected to the horizontal polarization antenna. A second input end of the second phase shifting unit is connected to the vertical polarization antenna. An output end of the second phase shifting unit is connected to a second input end of the combining unit. An output end of the combining unit is connected to an input end of the receive radio frequency unit corresponding to the receive feed unit.

Correspondingly, the first phase shifting unit is configured to: move the phase of the vertical polarization signal from the vertical polarization antenna forward by 90 degrees relative to the phase of the horizontal polarization signal from the horizontal polarization antenna to obtain the first echo signal; and send the first echo signal to the combining unit.

Correspondingly, the second phase shifting unit is configured to: move the phase of the horizontal polarization signal from the horizontal polarization antenna forward by 90 degrees relative to the phase of the vertical polarization signal from the vertical polarization antenna to obtain the second communication signal; and send the second communication signal corresponding to the at least one first terminal to the combining unit.

Correspondingly, the combining unit is configured to: perform combination processing on the first echo signal from the first phase shifting unit and the second communication signal that is from the second phase shifting unit and that corresponds to the at least one first terminal to obtain the combined signal; and send the combined signal to the receive radio frequency unit.

Correspondingly, the receive radio frequency unit is configured to receive the combined signal, and send the combined signal to the signal processing unit.

According to the communication apparatus provided in this embodiment of this application, the at least one receive radio frequency unit, the at least one receive feed unit, and the at least one target receive antenna unit are in a one-to-one correspondence. The receive feed unit performs combination processing on the signals from the two phase shifting units and then transmits to one receive radio frequency unit, so that a quantity of receive radio frequency units can be reduced. This reduces costs and overheads.

In an embodiment, for example, each of the at least one target receive antenna unit includes a linear polarization antenna combination, and the linear polarization antenna combination includes a horizontal polarization antenna and a vertical polarization antenna. The apparatus further includes at least one receive radio frequency unit group and at least one receive feed unit. The at least one target receive antenna unit, the at least one receive feed unit, and the at least one receive radio frequency unit group correspond to each other. The at least one target receive antenna unit is connected to an input end of the at least one receive feed unit. An output end of the at least one receive feed unit is connected to an input end of the at least one receive radio frequency unit group. An output end of the at least one receive radio frequency unit group is connected to the signal processing unit. The receive radio frequency unit group includes a first receive radio frequency unit and a second receive radio frequency unit.

In an embodiment, when each of the at least one target receive unit includes the at least one linear polarization antenna combination, and the linear polarization antenna combination includes the horizontal polarization antenna and the vertical polarization antenna, the receive feed unit is configured to: receive a horizontal polarization signal from the horizontal polarization antenna in the target receive antenna unit and a vertical polarization signal from the vertical polarization antenna in the target receive antenna unit; move a phase of the vertical polarization signal forward by 90 degrees relative to a phase of the horizontal polarization signal to obtain the first echo signal; move the phase of the horizontal polarization signal forward by 90 degrees relative to the phase of the vertical polarization signal to obtain the second communication signal; send the first echo signal to the first receive radio frequency unit in the receive radio frequency unit group corresponding to the receive feed unit; and send the second communication signal to the second receive radio frequency unit in the receive radio frequency unit group corresponding to the receive feed unit. The first receive radio frequency unit in the receive radio frequency unit group corresponding to the receive feed unit is configured to receive the first echo signal from the receive feed unit, and send the first echo signal to the signal processing unit. The second receive radio frequency unit in the receive radio frequency unit group corresponding to the receive feed unit is configured to receive the second communication signal from the receive feed unit, and send the second communication signal to the signal processing unit. The signal processing unit is configured to receive the first echo signal and the second communication signal.

In an embodiment, one receive feed unit is used as an example. The receive feed unit may include a first phase shifting unit and a second phase shifting unit. A first input end of the first phase shifting unit is connected to the antenna horizontal polarization antenna in the linear polarization antenna combination corresponding to the receive feed unit. A second input end of the first phase shifting unit is connected to the vertical polarization antenna in the linear polarization antenna combination. An output end of the first phase shifting unit is connected to an input end of the first receive radio frequency unit in the receive radio frequency unit group corresponding to the receive feed unit. A first input end of the second phase shifting unit is connected to the horizontal polarization antenna. A second input end of the second phase shifting unit is connected to the vertical polarization antenna. An output end of the second phase shifting unit is connected to an input end of the second receive radio frequency unit in the receive radio frequency unit group corresponding to the receive feed unit.

Correspondingly, the first phase shifting unit is configured to: move the phase of the vertical polarization signal from the vertical polarization antenna forward by 90 degrees relative to the phase of the horizontal polarization signal from the horizontal polarization antenna to obtain the first echo signal; and send the first echo signal to the first receive radio frequency unit.

Correspondingly, the second phase shifting unit is configured to: move the phase of the horizontal polarization signal from the horizontal polarization antenna forward by 90 degrees relative to the phase of the vertical polarization signal from the vertical polarization antenna to obtain the second communication signal; and send the second communication signal corresponding to the at least one first terminal to the second receive radio frequency unit.

Correspondingly, the first receive radio frequency unit is configured to receive the first echo signal, and send the first echo signal to the signal processing unit. The second receive radio frequency unit is configured to receive the second communication signal corresponding to the at least one first terminal, and send the second communication signal corresponding to the at least one first terminal to the signal processing unit.

According to the communication apparatus provided in this embodiment of this application, the at least one receive radio frequency unit group, the at least one receive feed unit, and the at least one target receive antenna unit are in a one-to-one correspondence. The receive feed unit does not need to perform combination processing on the signals from the two phase shifting units, but directly sends the signals from the two phase shifting units to the two receive radio frequency units in the receive radio frequency unit group, so that circuit complexity of the receive feed unit and processing complexity of the signal processing unit can be reduced.

In an embodiment, a guard band is included between at least two of the first subband, the second subband, and the second frequency band.

According to the communication apparatus provided in this embodiment of this application, a guard frequency band is set between frequency bands occupied by the radar signal (including the radar signal and/or the first echo signal) and the communication signal (including the first communication signal and/or the second communication signal), to avoid mutual interference between different types of signals.

According to a second aspect, an embodiment of this application further provides a road side unit RSU. The RSU includes the communication apparatus according to the first aspect or the embodiments of the first aspect.

According to a third aspect, an embodiment of this application further provides a communication system. The communication system includes at least one terminal and the RSU in the second aspect.

According to a fourth aspect, an embodiment of this application further provides a communication method. The method may include: controlling at least one transmit antenna unit and at least one receive antenna unit to communicate with at least one first terminal on a first frequency band; controlling at least one target transmit antenna unit to send a radar signal on a second frequency band; and controlling at least one target receive antenna unit to receive a first echo signal on the second frequency band. The first echo signal includes an echo signal corresponding to at least one target. The at least one transmit antenna unit includes the at least one target transmit antenna unit. The at least one receive antenna unit includes the at least one target receive antenna unit. The first frequency band and the second frequency band do not overlap.

For a specific structure and design in the communication method provided in the fourth aspect, refer to the description of the first aspect.

According to a fifth aspect, an embodiment of this application further provides a signal processing apparatus. The apparatus includes a processing unit. The processing unit is configured to: control at least one transmit antenna unit and at least one receive antenna unit to communicate with at least one first terminal on a first frequency band; control at least one target transmit antenna unit to send a radar signal on a second frequency band; and control at least one target receive antenna unit to receive a first echo signal of the radar signal on the second frequency band. The first echo signal includes an echo signal corresponding to at least one target. The at least one transmit antenna unit includes the at least one target transmit antenna unit. The at least one receive antenna unit includes the at least one target receive antenna unit. The first frequency band and the second frequency band do not overlap.

For a specific structure and design in the signal processing apparatus provided in the fifth aspect, refer to the description of the first aspect.

According to a sixth aspect, an embodiment of this application further provides a signal processing apparatus. The apparatus includes at least one communication interface and at least one processor. The at least one communication interface is configured to communicate with at least one transmit antenna unit and at least one receive antenna unit. When executing program code or instructions, the at least one processor implements the method according to any one of the fourth aspect or the embodiments of the fourth aspect.

In an embodiment, the signal processing apparatus may further include at least one memory. The storage area is configured to store the program code or the instructions.

In an embodiment, the signal processing apparatus according to the sixth aspect may be a chip apparatus or an integrated circuit in the communication apparatus according to the first aspect.

According to a seventh aspect, an embodiment of this application further provides a computer-readable storage medium, configured to store a computer program. The computer program includes instructions used to implement the method according to any one of the fourth aspect or the embodiments of the fourth aspect.

According to an eighth aspect, an embodiment of this application further provides a computer program product including instructions. When the computer program product runs on a computer, the computer is enabled to implement the method according to any one of the fourth aspect or the embodiments of the fourth aspect.

DESCRIPTION OF EMBODIMENTS

The following describes technical solutions of this application with reference to accompanying drawings.

First, some terms in embodiments of this application are described.

1. Electronic Toll Collection (ETC) System, Road Side Unit (RSU), and on Board Unit (OBU)

The ETC system includes the RSU installed on an ETC exclusive lane of a toll station and the OBU installed on a vehicle. The RSU performs dedicated link interaction with the OBU by using a dedicated short range communication (DSRC) technology, and performs background settlement with banks by using a computer networking technology. In this way, vehicles can pay tolls without stopping at toll stations. This greatly alleviates traffic congestion.

2. Direction of Arrival (DOA)

The DOA refers to a direction of arrival of a spatial signal, namely, a direction angle at which each signal arrives at an antenna in a receive antenna array. The DOA may include a horizontal angle in a horizontal direction and/or a tilt angle in a vertical direction. In some cases, the DOA has a similar function as an angle of arrival (AOA).

3. Beamforming (BF)

Beamforming is a signal preprocessing technology based on an antenna array. A weighting coefficient of each antenna in an antenna array is adjusted based on a DOA, to generate at least one directional beam, so that an obvious array gain can be obtained.

For example, the DOA may be estimated based on an uplink signal received by a receive antenna, and a beamforming vector is calculated based on the DOA. The beamforming vector indicates a weighting coefficient of each antenna in a transmit antenna array. Beamforming may be performed, based on the beamforming vector, on a downlink signal sent by the transmit antenna array.

In an embodiment, the beamforming in this embodiment of this application may be digital beamforming (DBF) or analog beamforming. This is not limited in this embodiment of this application. For example, beamforming may be DBF.

4. Virtual Aperture Technology of a Multiple-Input Multiple-Output (MIMO) Radar

The MIMO radar is a radar with a plurality of transmit antennas and a plurality of receive antennas. The MIMO radar is an effective method that can improve an angle resolution. The angle resolution of the radar is related to an aperture of a receive antenna array. A higher aperture indicates a higher resolution.

Figure 1:
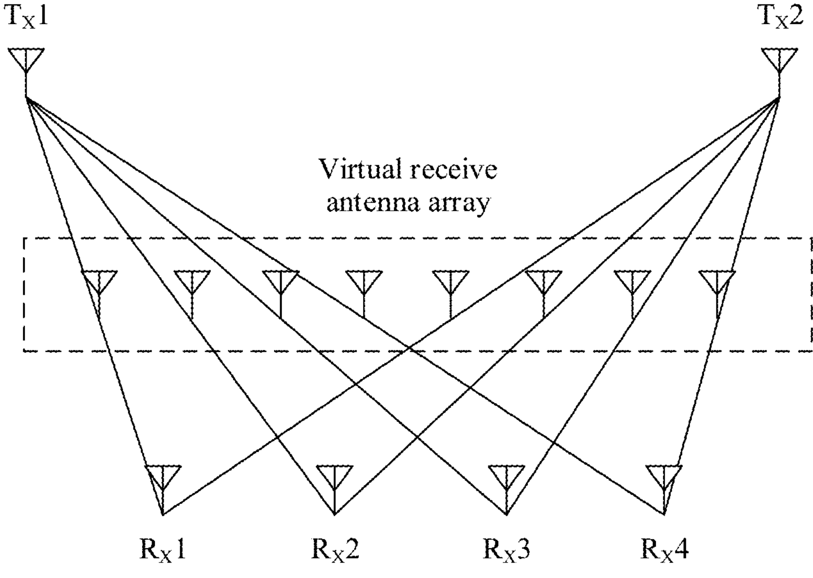
FIG. 1 is a schematic diagram of a virtual antenna of a MIMO radar according to an embodiment of this application.

As shown in FIG. 1, in a MIMO radar with 2Tx and 4Rx (namely, two transmit antennas and four receive antennas), Tx1 may form four virtual array elements with Rx1 to Rx4, and Tx2 may also form four virtual receive antennas with Rx1 to Rx4. In this way, the MIMO radar with 2Tx and 4Rx may be equivalent to a virtual receive antenna array having eight virtual receive antennas.

Therefore, the MIMO radar with 2Tx and 4Rx may be equivalent to a single-input multiple-output (SIMO) radar with 1Tx and 8Rx. An aperture of a receive antenna array is extended from a physical 4Rx to a virtual 8Rx. This can improve the angle resolution.

For example, if the angle resolution of a MIMO radar with 1Tx and 4Rx is 30°, the angle resolution of a MIMO radar with 2Tx and 4Rx (equivalent to 1Tx and 8Rx) is approximately 150.

It should be noted that, because the 2Tx included in the MIMO radar shown in FIG. 1 is arranged in one row and two columns, the 4Rx is arranged in one row and four columns, and both the 2Tx and the 4Rx are arranged in a horizontal direction, an aperture of the receive antenna array is extended in the horizontal direction. This improves a resolution of a horizontal angle. However, this is not limited in this embodiment of this application. Similarly, the 2Tx and the 4Rx may alternatively be arranged in a vertical direction. According to a principle similar to that in FIG. 1, an aperture of the receive antenna array may be extended in the vertical direction. This improves a resolution of a pitch angle.

It should be further noted that 2Tx and 4Rx in FIG. 1 are merely an example, and this embodiment of this application is not limited thereto. In an embodiment, the MIMO radar may include NTx and MRx, where both M and N are integers greater than 1.

Further, both the NTx and the MRx of the MIMO radar may be arranged in a horizontal direction and a vertical direction, respectively. In this way, an aperture of the receive antenna array may be extended in both the horizontal direction and the vertical direction. This improves a resolution of a horizontal angle and a resolution of a pitch angle.

Figure 2:
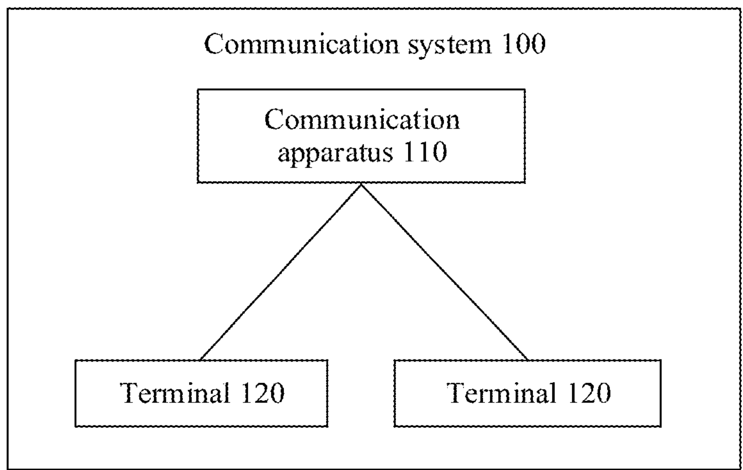
FIG. 2 is a schematic block diagram of a communication system 100 according to an embodiment of this application.

FIG. 2 is a schematic block diagram of a communication system 100 according to an embodiment of this application. The communication system 100 includes a communication apparatus 110 and at least one terminal 120. The communication apparatus 110 can communicate with the at least one terminal 120.

In an embodiment, the communication apparatus 110 may communicate with the terminal 120 in a wireless manner.

It should be noted that, communication in the wireless manner may be implemented by using a communication network. The communication network may be a local area network, or may be a wide area network switched by using a relay device, or may include a local area network and a wide area network. When the communication network is the local area network, for example, the communication network may be a Wi-Fi hotspot network, a Wi-Fi P2P network, a Bluetooth network, a ZigBee network, a near field communication (NFC) network, a future possible universal short range communication network, or a dedicated short range communication (DSRC) network. When the communication network is a wide area network, for example, the communication network may be a 3$^{rd}$-generation mobile communication technology (3G) network, a 4$^{th}$-generation mobile communication technology (4G) network, a 5$^{th}$-generation mobile communication technology (5G) network, a PLMN, or the Internet. This is not limited in this embodiment of this application.

In an embodiment, the communication apparatus 110 may have a plurality of forms. This is not limited in this embodiment of this application.

In an embodiment, the communication apparatus may be an independent device.

In another embodiment, the communication apparatus may be integrated into another device.

In an embodiment, the terminal 120 may have a plurality of forms. This is not limited in this embodiment of this application.

In an embodiment, the terminal may be an independent device.

For example, the terminal may be a mobile phone, a tablet computer (pad), a computer with a wireless transceiver function, a virtual reality (VR) terminal, an augmented reality (AR) terminal, a wireless terminal in industrial control, a wireless terminal in self driving, a wireless terminal in remote medical, a wireless terminal in smart grid, a wireless terminal in transportation safety, a wireless terminal in smart city, or a wireless terminal in smart home.

For example, the terminal may be a vehicle, a smart home device, an intelligent wearable device, an uncrewed aerial vehicle, or a robot.

In another embodiment, the terminal may be integrated into another device. For example, the terminal may be a device, for example, an OBU, that is integrated or installed in a transportation tool and that is a part of the transportation tool.

In an embodiment, the transportation tool in this embodiment of this application may include a vehicle, for example, a vehicle that can implement an automatic driving, intelligent driving, or self driving function.

In an embodiment, the communication system 100 may be applicable to an ETC charging scenario. In this application scenario, the communication apparatus 110 in FIG. 2 may be an RSU, and the terminal 120 may be an OBU on a vehicle or the vehicle.

Figure 3:
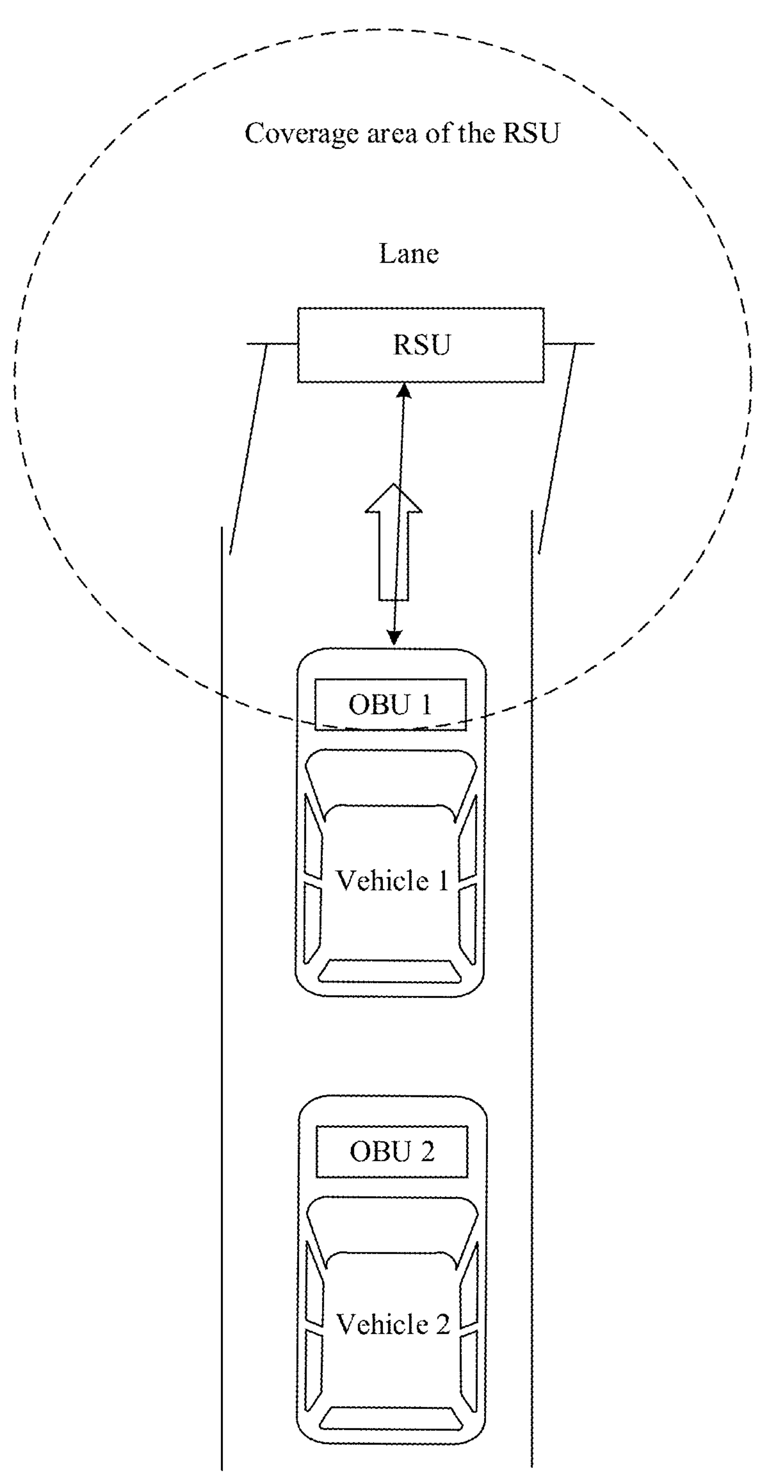
FIG. 3 is a schematic diagram of an application scenario according to an embodiment of this application.

For example, FIG. 3 is a schematic diagram of an ETC charging scenario. As shown in FIG. 3, an RSU is deployed on a lane, and a vehicle 1 and a vehicle 2 travel on the lane.

When the vehicle 1 enters a coverage area of the RSU, the RSU communicates with an OBU 1 in the vehicle 1, to implement automatic payment. In the foregoing scenario, the following problems occur:

(1) The RSU can cover only a single lane, and a quantity of RSUs is in direct proportion to a quantity of lanes. Therefore, in a multi-lane scenario, costs are high and a maintenance workload is large.

(2) The coverage area of the RSU is small. In other words, a maximum communication distance of the RSU is short, and is usually only approximately 15 to 20 meters. After the vehicle 1 enters the coverage area of the RSU, the RSU can communicate with the OBU 1 in the vehicle 1. In other words, communication time is short. In this way, payment may fail.

It should be noted that the coverage area of the RSU is a sphere with the RSU as a center and the maximum communication distance of the RSU as a radius.

Figure 4:
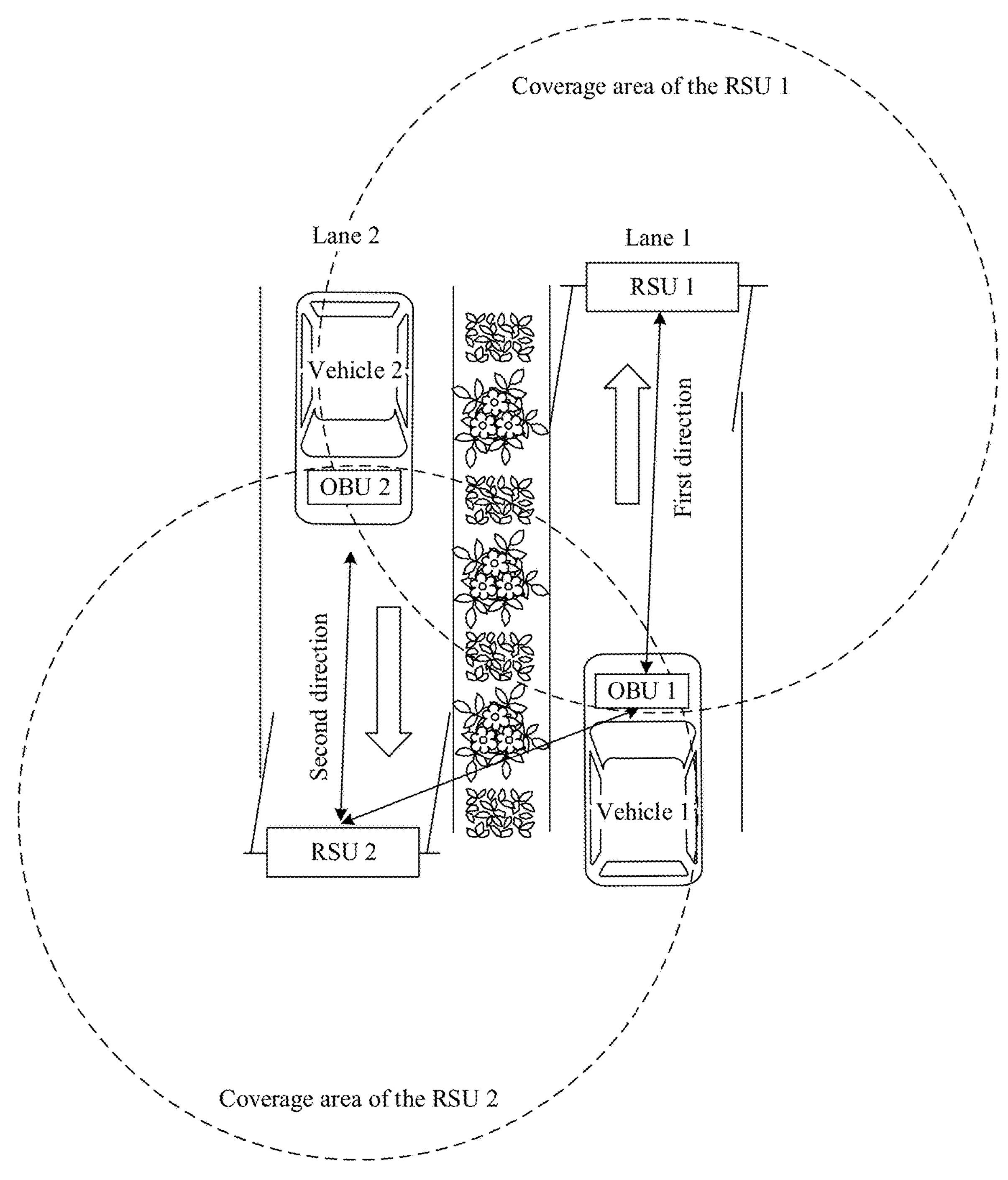
FIG. 4 is a schematic diagram of another application scenario according to an embodiment of this application.

For another example, FIG. 4 is a schematic diagram of another ETC charging scenario. As shown in FIG. 4, an RSU 1 is deployed on a lane 1, and an RSU 2 is deployed on a lane 2. A speed direction of a vehicle 1 on the lane 1 is a first direction, and a speed direction of a vehicle 2 on the lane 2 is a second direction. The RSU 1 performs an ETC transaction with the OBU 1 on the vehicle 1, and the RSU 2 performs an ETC transaction with the OBU 2 on the vehicle 2.

In the scenario shown in FIG. 4, ETC communication is intra-frequency communication, an anti-interference capability is poor, and a beamwidth of a downlink beam of an ETC signal, namely, an angle range covered by the downlink beam, is wide. Therefore, a problem of incorrect transaction of a reverse lane may occur. For example, the OBU 1 in FIG. 4 is used as an example. In a process in which the RSU 1 performs an ETC transaction with the OBU 1, the OBU 1 may also enter a coverage area of the RSU 2 on a reverse lane, and the RSU 2 may also perform an ETC transaction with the OBU 1. Therefore, the RSU 1 and the RSU 2 may both charge the OBU 1.

In conclusion, an existing RSU has poor operation efficiency and performance.

To improve operation efficiency and performance of the RSU, in a conventional technology, a radar apparatus with a strong sensing and detection capability is usually further disposed on a road side, and the sensing and detection capability of the radar apparatus is used to instruct the RSU to communicate with the OBU. In this way, in addition to the ETC, the radar apparatus needs to be installed on the road side. Therefore, costs and overheads are high.

To resolve the problems of poor efficiency and performance of the existing RSU, this application provides a communication apparatus. The communication apparatus can implement receiving and sending of a radar signal and a communication signal by using a set of transmit and receive antenna units. This can reduce costs and overheads. In addition, the communication apparatus has a capability of radar detection, and also has a capability of communicating with a terminal. This helps instruct ETC payment as accurately as possible based on a result of radar detection, and improves operation efficiency and performance of the communication apparatus of integrated sensing and communication.

Figures 5, 6:
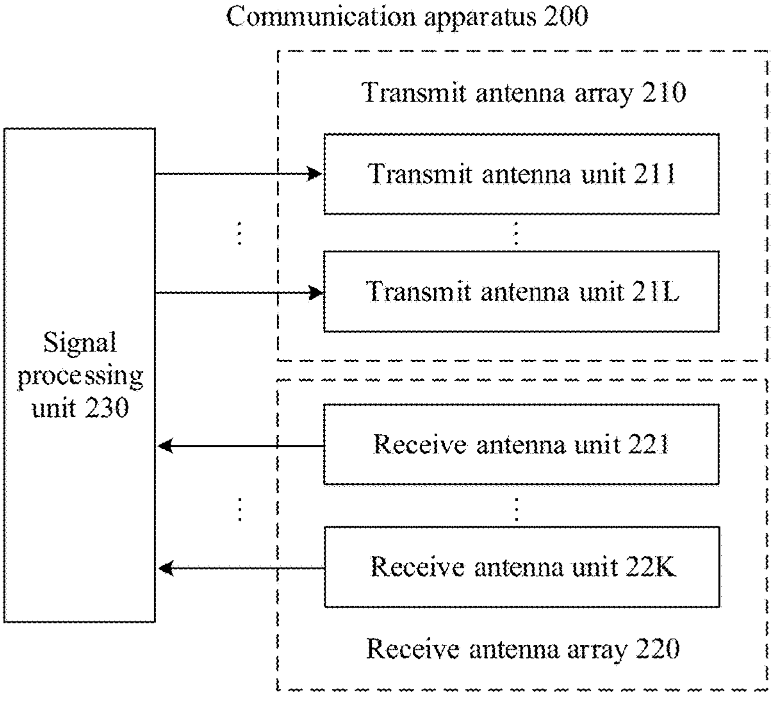
FIG. 5 is a schematic block diagram of a communication apparatus 200 according to an embodiment of this application.
FIG. 6 is a schematic diagram of signal frequency band distribution according to an embodiment of this application.

FIG. 5 is a schematic diagram of a structure of a communication apparatus 200 according to an embodiment of this application. The communication apparatus 200 may be the communication apparatus 110 in the communication system 100 shown in FIG. 1.

As shown in FIG. 5, for example, the communication apparatus 200 may include L transmit antenna units (for example, a transmit antenna unit 211 to a transmit antenna unit 21L), K receive antenna units (for example, a receive antenna unit 221 to a receive antenna unit 22K), and a signal processing unit 230. The signal processing unit 230 is separately connected to the L transmit antenna units and the K receive antenna units, where both L and K are integers greater than 0.

The signal processing unit 230 is configured to communicate with at least one first terminal on a first frequency band by using the L transmit antenna units and the K receive antenna units.

In an embodiment, the first frequency band may include a first subband and a second subband. The first subband and the second subband do not overlap. The signal processing unit 230 is configured to: send a first communication signal to the at least one first terminal on the first subband by using the L transmit antenna units; and receive a second communication signal from the at least one first terminal on the second subband by using the K receive antenna units.

It should be noted that the first communication signal and the second communication signal support the first communication protocol standard. In other words, the first communication signal and the second communication signal may be understood as signals transmitted when the communication apparatus communicates with the terminal in the first communication protocol standard.

It should be noted that, in this embodiment of this application, only an example in which the first communication protocol standard is an ETC communication protocol standard is used for description. However, it should be learned that the first communication protocol standard may alternatively be another communication protocol standard. This is not limited in this embodiment of this application.

The signal processing unit 230 is further configured to send a radar signal on a second frequency band by using $L_1$ target transmit antenna units, and receive a first echo signal of the radar signal on the second frequency band by using $K_1$ target receive antenna units. The first echo signal includes an echo signal corresponding to at least one target. The L transmit antenna units include the $L_1$ target transmit antenna units. The K receive antenna units include the $K_1$ target receive antenna units. The first frequency band and the second frequency band do not overlap.

In an embodiment, the signal processing unit 230 may include one or more processors.

In an embodiment, the processor may be a general purpose processor, a digital signal processor (DSP), a coprocessor, an application-specific integrated circuit (ASIC), a field programmable gate array (FPGA) or another programmable logic device, a discrete gate or a transistor logic device, a discrete hardware component, or the like. This is not limited in this embodiment of this application.

For example, the signal processing unit 230 may include a first processor and a second processor. The first processor is configured to generate a to-be-sent signal, and control the L transmit antenna units to send a signal. The second processor is configured to control the K receive antenna units to receive a signal, and process the received signal.

For another example, the signal processing unit 230 may include a processor. The processor is configured to: generate a to-be-sent signal, and control the L transmit antenna units to send the signal; and control the K receive antenna units to receive a signal, and process the received signal.

In an embodiment, the at least one target may include at least one second terminal. The at least one second terminal may include the at least one first terminal, or the at least one second terminal is partially or completely different from the at least one first terminal.

In an embodiment, the communication apparatus 200 may implement sensing and communication functions on different frequency bands. For example, the first communication signal and the second communication signal support the ETC communication protocol. The second frequency band may be another frequency band other than the first subband and the second subband in available frequency bands. The first frequency band, the first subband, and the second subband do not overlap with each other.

For example, an operation frequency range of a radio communication device on the 5.8 G band is 5725-5850 MHz, and the communication apparatus performs ETC communication with a second terminal. FIG. 6 is a schematic diagram of signal frequency band distribution of a communication apparatus 200. The foregoing frequency band distribution includes at least one of the following: The first subband occupied by the first communication signal includes some or all frequencies on a frequency band 2 (5827.5-5842.5 MHz), the second subband occupied by the second communication signal includes some or all frequencies on a frequency band 4 (5787.5-5802.5 MHz), and the second frequency band occupied by the radar signal (including the first radar signal and the first echo signal) includes some or all frequencies on a frequency band 1 (5725-5787.5 MHz) of a low frequency part, a frequency band 3 (5802.5-5827.5 MHz) of an intermediate frequency part, or a frequency band 5 (5842.5-5850 MHz) of a high frequency part.

It may be learned from FIG. 6 that, a maximum bandwidth of the radar signal may be (5787.5-5725)+(5827.5-5802.5)+(5850-5842.5)=95 MHz, a maximum bandwidth of the first communication signal is (5842.5-5827.5)=15 MHz, and a maximum bandwidth of the second communication signal is (5802.5-5787.5)=15 MHz. In other words, the bandwidth of the radar signal is greater than the bandwidth of the communication signal.

It should be noted that a wider bandwidth, a higher resolution, and higher precision of a signal indicate a stronger sensing capability. Therefore, the resolution and precision of the radar signal are higher. In addition, the coverage of the radar signal is larger than that of the communication signal due to the operation mechanism of signal coherent accumulation.

According to the communication apparatus provided in this embodiment of this application, a narrow-bandwidth communication signal can be sent, and a high-bandwidth radar signal with higher precision and wider coverage can also be sent.

Because hardware designs of OBU manufacturers are different, an uplink signal has a specific frequency offset. Therefore, for this frequency offset, a part of a guard frequency band needs to be added to a frequency band occupied by the uplink signal (namely, the first communication signal), to avoid mutual interference between two different types of signals: the communication signal and the radar signal.

In an embodiment, a width of the guard frequency band may be 1.2 MHz.

Figure 7:
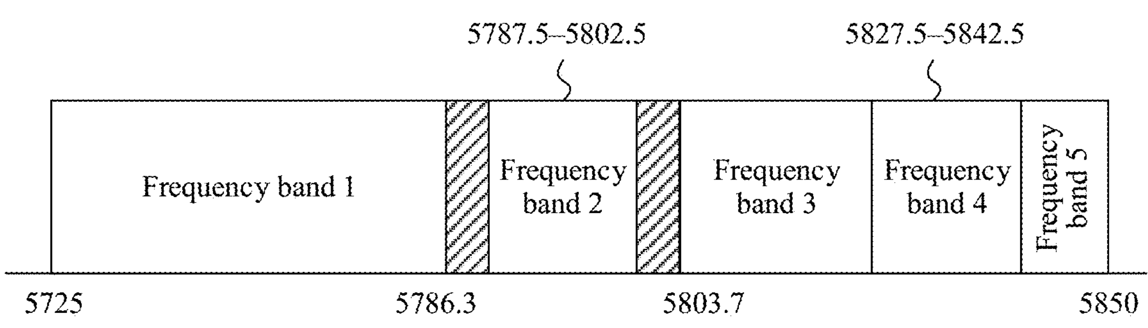
FIG. 7 is a schematic diagram of another signal frequency band distribution according to an embodiment of this application.

For another example, FIG. 7 is a schematic diagram of another signal frequency band distribution of a communication apparatus of integrated sensing and communication. The foregoing frequency band distribution includes at least one of the following: The first subband occupied by the first communication signal includes some or all frequencies on a frequency band 2 (5787.5-5802.5 MHz), the second subband occupied by the second communication signal includes some or all frequencies on a frequency band 4 (5827.5-5842.5 MHz), and the second frequency band occupied by the radar signal (including the first radar signal and the first echo signal) includes some or all frequencies on a frequency band 1 (5725-5786.3 MHz) of a low frequency part, a frequency band 3 (5803.7-5827.5 MHz) of an intermediate frequency part, or a frequency band 5 (5842.5-5850 MHz) of a high frequency part. A frequency band shown in a shadow part in FIG. 7 is a guard frequency band.

It should be noted that frequency band distribution of the radar signal and the communication signal shown in FIG. 6 and FIG. 7 is merely an example, and this embodiment of this application is not limited thereto. In an embodiment, the radar signal and the communication signal may alternatively use another frequency band distribution manner. This is not limited in this embodiment of this application.

The communication apparatus provided in this embodiment of this application may implement two functions of receiving and sending of the radar signal and receiving and sending of the communication signal in a frequency division manner by using one set of transmit and receive antenna units.

According to the communication apparatus provided in this embodiment of this application, receiving and sending of the radar signal and the communication signal can be implemented by using one set of transmit and receive antenna units, namely, the L transmit antenna units and the K receive antenna units. This can reduce costs and overheads. The radar signal and the communication signal occupy different frequency bands.

Further, the communication apparatus can further perform tracking, positioning, and speed measurement on the at least one first terminal based on the first echo signal, and accurately instruct the communication apparatus to communicate with the first terminal. This increases a success rate and reliability of an ETC transaction. In addition, the communication apparatus provided in this embodiment of this application implements the foregoing two functions by using one set of transmit and receive antenna units (including the L transmit antenna units and the K receive antenna units). This can reduce costs and overheads.

In an embodiment, L may be equal to 1 or greater than 1, and/or K may be equal to 1 or greater than 1. This is not limited in this embodiment of this application.

In an embodiment, when L is greater than 1, the transmit antenna units 211 to 21L may be referred to as a transmit antenna array 210. Similarly, when K is greater than 1, the receive antenna units 221 to 22K may be referred to as a receive antenna array 220.

In an embodiment, the communication apparatus 200 may perform beamforming on signals sent by the transmit antenna units 211 to 21L in the transmit antenna array 210, and send, through the transmit antenna units 211 to 21L, the first communication signal that is obtained through beamforming and that corresponds to each of the at least one first terminal.

Similarly, the communication apparatus 200 may perform beamforming on signals received by the receive antenna units 221 to 22K in the receive antenna array 220, and obtain the second communication signal from each of the at least one first terminal after beamforming.

Figure 8:
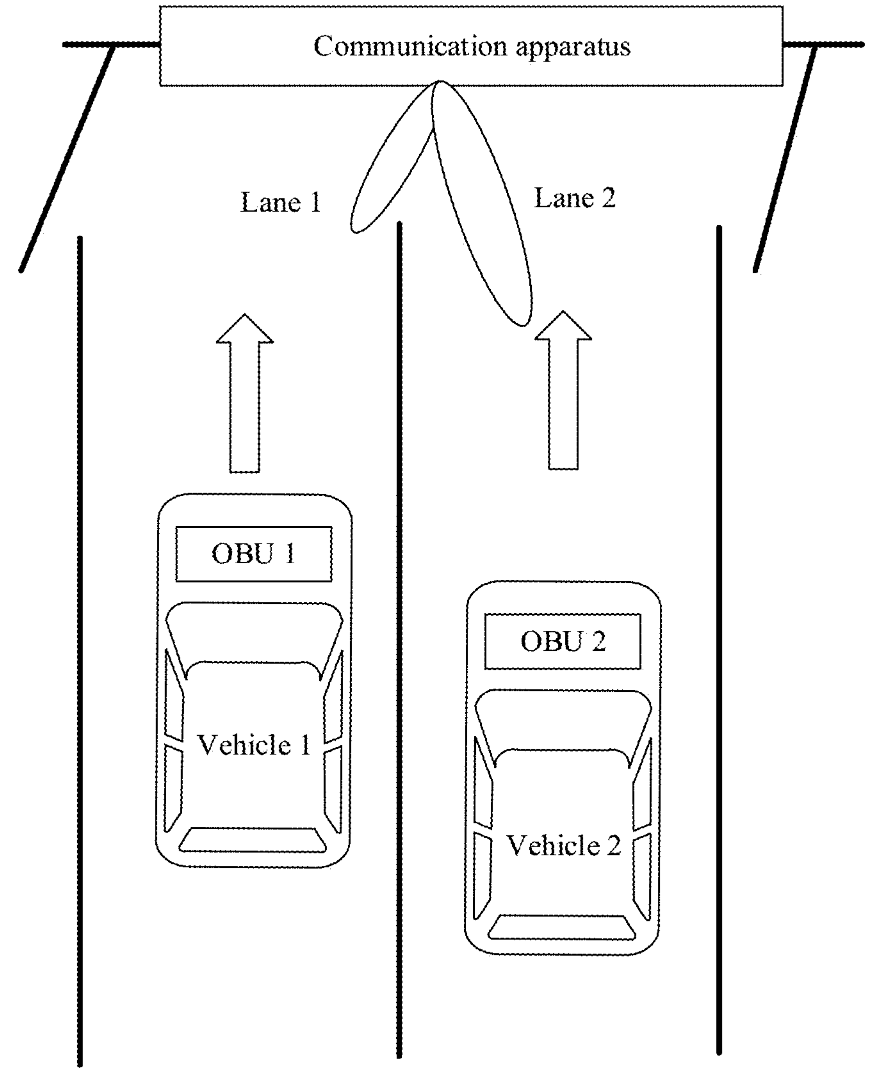
FIG. 8 is a schematic diagram of still another application scenario according to an embodiment of this application.

For example, FIG. 8 is a schematic diagram of still another application scenario according to an embodiment of this application. As shown in FIG. 8, the communication apparatus may perform beamforming on a signal sent by the transmit antenna array, send, to an OBU 1 on a lane 1, a first communication signal that is obtained through beamforming and that corresponds to the OBU 1, and send, to an OBU 2 on a lane 2, a second communication signal that is obtained through beamforming and that corresponds to the OBU 2, so that multi-lane coverage can be implemented.

The communication apparatus provided in this embodiment of this application can communicate with first terminals on a plurality of lanes as accurately as possible. This helps improve operation efficiency and performance of the communication apparatus of integrated sensing and communication.

In addition, only one communication apparatus of integrated sensing and communication provided in this embodiment of this application needs to be disposed for a plurality of lanes, so that multi-lane coverage and multi-lane vehicle sensing can be implemented. This reduces costs and overheads and maintenance amounts.

In an embodiment, that the L transmit antenna units include the $L_1$ target transmit antenna units may be understood as $L \geq L_1$. In other words, the $L_1$ target transmit antenna units are some or all of the L transmit antenna units. Similarly, that the K receive antenna units include the $K_1$ target receive antenna units may be understood as $K \geq K_1$. In other words, the $K_1$ target receive antenna units are some or all of the K receive antenna units. This is not limited in this embodiment of this application.

Figures 9, 10:
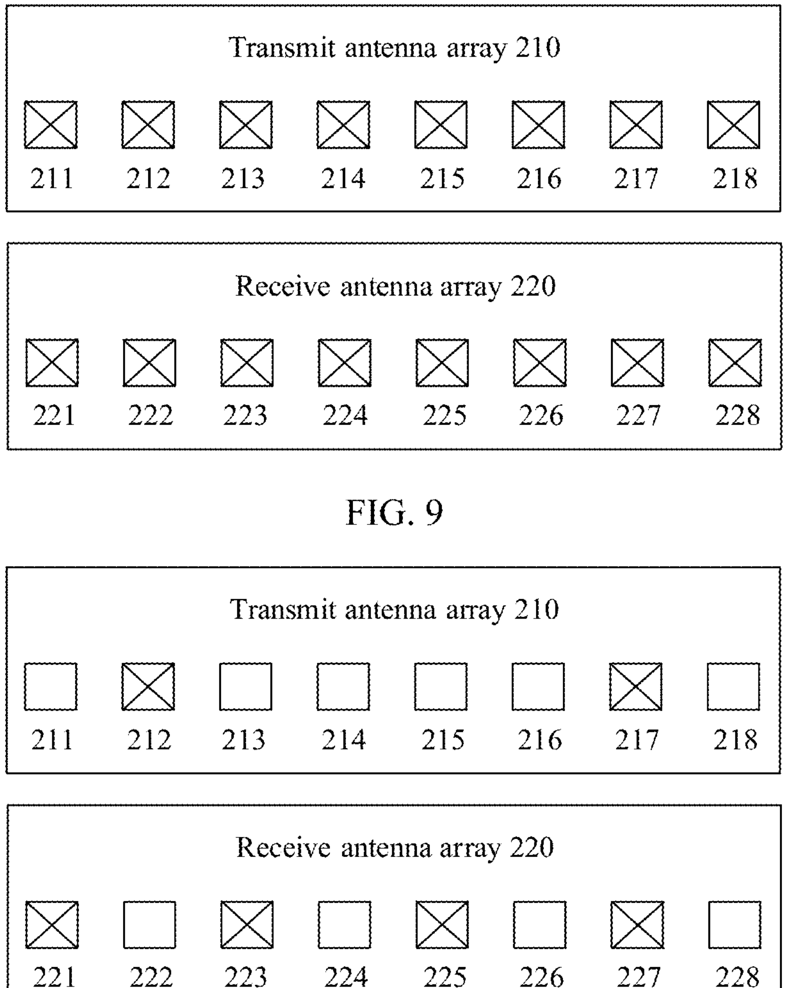
FIG. 9 is a schematic diagram of an antenna array according to an embodiment of this application.
FIG. 10 is a schematic diagram of another antenna array according to an embodiment of this application.

For example, the communication apparatus includes a transmit antenna array and a receive antenna array. The transmit antenna array includes 8Tx. The receive antenna array includes 8Rx. For example, both 8Tx and 8Rx are arranged in one row and eight columns. FIG. 9 is a schematic diagram of an antenna array according to an embodiment of this application. As shown in "▭" in FIG. 9, the communication apparatus may send the first communication signal corresponding to the at least one first terminal through transmit antenna units 211 to 218 (namely, 8Tx), and receive the second communication signal corresponding to the at least one first terminal through receive antenna units 221 to 228 (namely, 8Rx). As shown in "⋈" in FIG. 9, the communication apparatus may further send the radar signal through the transmit antenna units 211 to 218 (namely, 8Tx) in a frequency division manner, and receive the first echo signal through the receive antenna units 221 to 228 (namely, 8Rx).

According to the communication apparatus provided in this embodiment of this application, based on a virtual aperture technology of a MIMO radar, 8Tx and 8Rx for receiving and sending the radar signal in FIG. 9 may be equivalent to 1Tx and 64Rx. Therefore, an aperture of a receive antenna array may be extended from 8 physical receive antenna units to 64 virtual receive antenna units, so that a resolution of a horizontal angle of a radar can be improved. This improves radar detection precision.

For example, the communication apparatus includes a transmit antenna array and a receive antenna array. The transmit antenna array includes 8Tx. The receive antenna array includes 8Rx. For example, both 8Tx and 8Rx are arranged in one row and eight columns. FIG. 10 is a schematic diagram of another antenna array according to an embodiment of this application. As shown in "▭" in FIG. 10, the communication apparatus may send the first communication signal corresponding to the at least one first terminal through transmit antenna units 211 to 218 (namely, 8Tx), and receive the second communication signal corresponding to the at least one first terminal through receive antenna units 221 to 228 (namely, 8Rx). As shown in "⋈" in FIG. 10, the communication apparatus may further send the radar signal through the transmit antenna units 212 to 217 (namely, 2Tx) in a frequency division manner, and receive the first echo signal through the receive antenna unit 221 to the receive antenna units 221, 223, 225, and 227 (namely, 4Rx).

According to the communication apparatus provided in this embodiment of this application, based on the virtual aperture technology of the MIMO radar, 2Tx and 4Rx for receiving and sending the radar signal in FIG. 10 may be equivalent to 1Tx and 8Rx. Therefore, an aperture of a receive antenna array may be extended from 4 physical receive antenna units to 8 virtual receive antenna units. In other words, a quantity of antenna units used can be reduced without reducing a resolution of a horizontal angle. This helps reduce signal processing complexity.

It should be noted that, both the transmit antenna unit and the receive antenna unit shown in FIG. 9 and FIG. 10 are arranged in the horizontal direction. In other words, improving the resolution of the horizontal angle of the radar signal based on the virtual aperture technology of the MIMO radar is merely an example. In an embodiment, the transmit antenna unit and/or the receive antenna unit of the communication apparatus may alternatively be arranged in a vertical direction. According to a similar principle, the communication apparatus may further improve a resolution of a tilt angle of the radar signal. Alternatively, the transmit antenna unit and/or the receive antenna unit of the communication apparatus may be arranged in a horizontal direction and a vertical direction. According to a similar principle, the communication apparatus may further improve both a resolution of a horizontal angle and a resolution of a pitch angle of a radar signal. Details are not described herein in this embodiment of this application.

In an embodiment, the transmit antenna unit in this embodiment of this application may include M transmit antennas, where M is an integer greater than 0. Similarly, the receive antenna unit may include N receive antennas, where N is an integer greater than 0.

In an embodiment, the M transmit antennas may be arranged in a plurality of manners. This is not limited in this embodiment of this application.

In an embodiment, when M=1, the M transmit antennas may be arranged in one row and one column.

Figure 11:
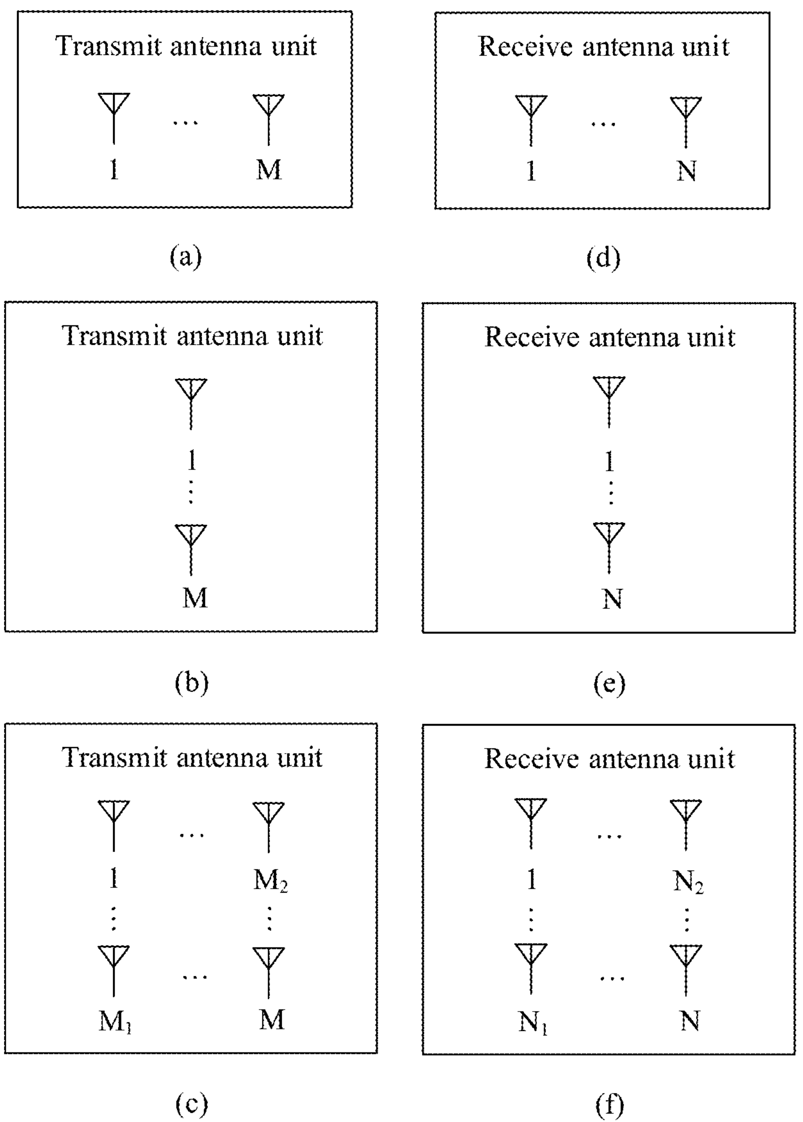
FIG. 11 is a schematic diagram of an antenna unit according to an embodiment of this application.

In another embodiment, when M>1, the M transmit antennas may be arranged in one row and M columns, as shown in (a) in FIG. 11; or the M transmit antennas may be arranged in M rows and one column, as shown in (b) in FIG. 11.

In still another embodiment, when M>1, the M transmit antennas may be arranged in $M_1$ rows and $M_2$ columns, where both $M_1$ and $M_2$ are integers greater than 0, and $M_1+M_2=M$, as shown in (c) in FIG. 11.

In an embodiment, the N receive antennas may be arranged in a plurality of manners. This is not limited in this embodiment of this application.

In an embodiment, when N=1, the N receive antennas may be arranged in one row and one column.

In another embodiment, when N>1, the N receive antennas may be arranged in one row and N columns, as shown in (d) in FIG. 11; or the N receive antennas may be arranged in N rows and one column, as shown in (e) in FIG. 11.

In still another embodiment, when N>1, the N receive antennas may be arranged in $N_1$ rows and $N_2$ columns, where both $N_1$ and $N_2$ are integers greater than 0, and $N_1+N_2=N$, as shown in (f) in FIG. 11.

Figure 12:
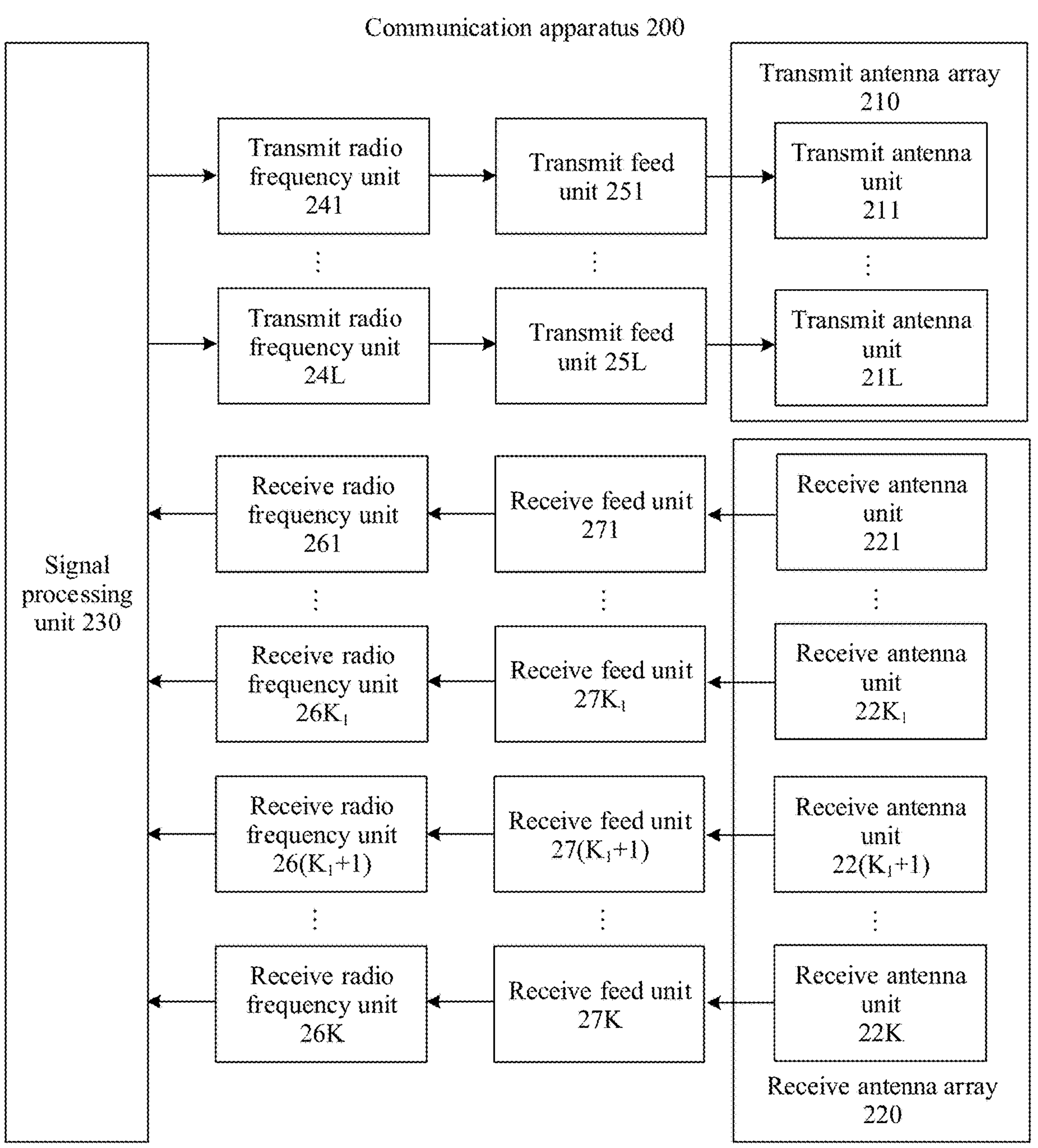
FIG. 12 is another schematic block diagram of a communication apparatus 200 according to an embodiment of this application.

Further, FIG. 12 is another schematic block diagram of the communication apparatus 200. As shown in FIG. 12, the communication apparatus 200 may further include L transmit radio frequency units (for example, transmit radio frequency units 241 to 24L), L transmit feed units (for example, transmit feed units 251 to 25L), K receive radio frequency units (for example, receive radio frequency units 261 to 26K), and K receive feed units. (for example, receive feed units 271 to 27K).

The transmit antenna units 211 to 21L, the transmit radio frequency units 241 to 24L, and the transmit feed units 251 to 25L are in a one-to-one correspondence. The signal processing unit 230 is connected to input ends of the transmit radio frequency units 241 to 24L. Output ends of the transmit radio frequency units 241 to 24L are connected to input ends of the transmit feed units 251 to 25L. Output ends of the transmit feed units 251 to 25L are connected to the transmit antenna units 211 to 21L.

The receive antenna units 221 to 22K, the receive radio frequency units 261 to 26K, and the receive feed units 271 to 27K are in a one-to-one correspondence. The receive antenna units 221 to 22K are connected to input ends of the receive feed units 271 to 27K. Output ends of the receive feed units 271 to 27K are connected to input ends of the receive radio frequency units 261 to 26K. Output ends of the receive radio frequency units 261 to 26K are connected to the signal processing unit 230.

In an embodiment, a transmit antenna in the L transmit antenna units may be an antenna of a plurality of polarization types. This is not limited in this embodiment of this application.

In an embodiment, for example, communication between the communication apparatus and the first terminal complies with the ETC communication protocol standard. In the ETC communication protocol standard, one or more of the L transmit antenna units may include at least one right-handed circular polarization antenna. In other words, both the first communication signal and the radar signal that are sent by the communication apparatus through the one or more of the L transmit antenna units are right-handed circular polarization signals.

Figure 13:
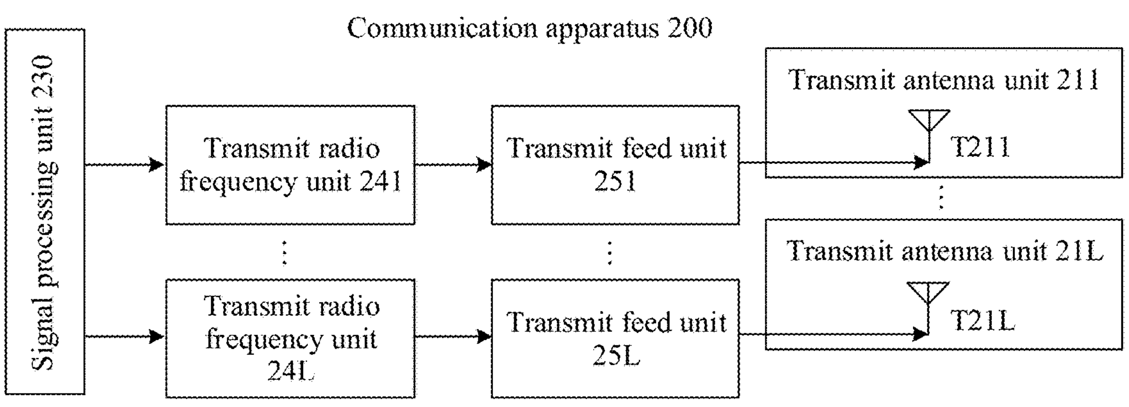
FIG. 13 is still another schematic block diagram of a communication apparatus 200 according to an embodiment of this application.

For example, each of the transmit antenna units 211 to 21L includes a right-handed circular polarization antenna, for example, right-handed circular polarization antennas T211 to T21L shown in FIG. 13. It should be noted that FIG. 13 shows only parts related to the transmit antenna units 211 to 21L in the communication apparatus 200, and other parts are not shown.

It should be noted that the circular polarization signal is observed in a propagation direction of the circular polarization signal, and an endpoint trajectory of an instantaneous electric field vector of the signal is a circle. If the instantaneous electric field vector rotates in a left-handed direction in the propagation direction, the instantaneous electric field vector is referred to as a left-handed circular polarization signal. If the instantaneous electric field vector rotates in a right-handed direction in the propagation direction, the instantaneous electric field vector is referred to as a right-handed circular polarization signal.

In an embodiment, a function implemented by the transmit radio frequency unit and/or the transmit feed unit in this embodiment of this application may be implemented by hardware or software. This is not limited in this embodiment of this application.

In an embodiment, the transmit radio frequency unit in this embodiment of this application may include a transmit radio frequency circuit. The transmit radio frequency circuit is configured to implement a function of the transmit radio frequency unit. It should be noted that, for a structure of the transmit radio frequency circuit, refer to a structure of a circuit having a similar function in the conventional technology.

In an embodiment, the transmit feed unit in this embodiment of this application may include a transmit feed circuit. The transmit feed circuit is configured to implement a function of the transmit feed unit. It should be noted that, for a structure of the transmit feed circuit, refer to a structure of a circuit having a similar function in the conventional technology.

It should be noted that, for clarity, receive antenna units 221 to 22$K_1$ in FIG. 12 represent the $K_1$ target receive antenna units that are multiplexed, and receive antenna units 22($K_1$+1) to 22K represent $K_2$ receive antenna units that are not multiplexed, where $K_1+K_2=K$.

It should be noted that, for example, communication between the communication apparatus and the first terminal complies with the ETC communication protocol standard. In the ETC communication protocol standard, the second communication signal sent by the second terminal to the communication apparatus is still a right-handed circular polarization signal. Correspondingly, a receive antenna configured to receive the second communication signal needs to receive the right-handed circular polarization signal. For the first echo signal, when the radar signal is a right-handed circular polarization signal, the first echo signal generated by reflecting the radar signal through the vehicle in which the second terminal is located becomes a reverse-handed circular polarization signal, namely, a left-handed circular polarization signal.

In this way, a receive antenna in the $K_1$ target receive antenna units that are multiplexed needs to receive two types of circular polarization signals: a right-handed circular polarization signal and a left-handed circular polarization signal, and a receive antenna in the $K_2$ receive antenna units that are not multiplexed may receive only a right-handed circular polarization signal.

In an embodiment, a receive antenna in the K target receive antenna units may be an antenna of a plurality of polarization types. This is not limited in this embodiment of this application.

In an embodiment, when $K>K_1$, a polarization type of a receive antenna in the $K_2$ receive antenna units other than the $K_1$ target receive antenna units in the K receive antenna units may be the same as or different from a polarization type of a receive antenna in the $K_1$ target receive antenna units. This is not limited in this embodiment of this application.

In an embodiment, the $K_2$ receive antenna units are not multiplexed, and only need to receive a right-handed circular polarization signal (the second communication signal). Therefore, one or more of the $K_2$ receive antenna units may include at least one right-handed circular polarization antenna.

Figure 14:
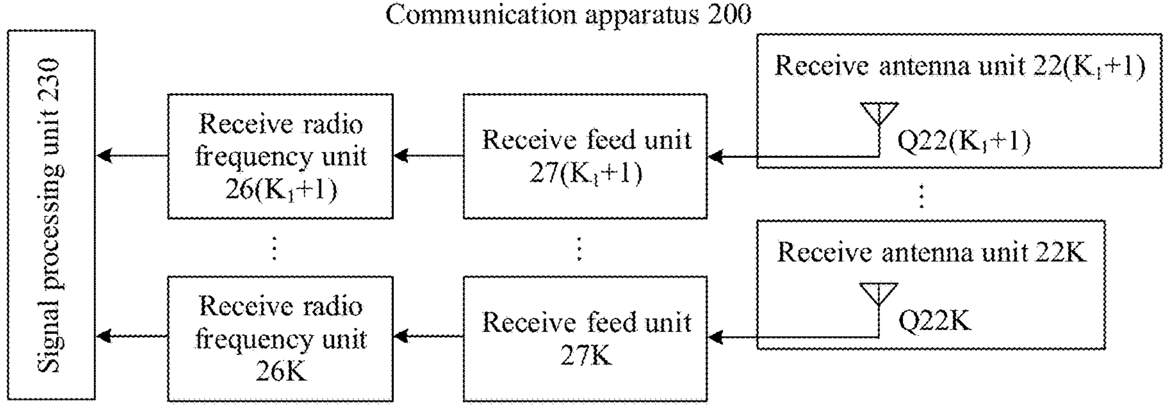
FIG. 14 is still another schematic block diagram of a communication apparatus 200 according to an embodiment of this application.

For example, each of the $K_2$ receive antenna units, namely, the receive antenna units 22($K_1$+1) to 22K, includes a right-handed circular polarization antenna, for example, right-handed circular polarization antennas Q22($K_1$+1) to Q22K shown in FIG. 14. It should be noted that FIG. 14 shows only parts related to the $K_2$ receive antenna units in the communication apparatus 200, and other parts are not shown.

In another embodiment, the $K_1$ receive antenna units are multiplexed. In other words, the $K_1$ receive antenna units need to receive both a right-handed circular polarization signal (the second communication signal) and a left-handed circular polarization signal (the first echo signal). Therefore, a polarization type of a receive antenna in the $K_2$ receive antenna units may be the same as a polarization type of a receive antenna in the $K_1$ target receive antenna units.

The following describes the polarization type of the receive antenna in the $K_1$ target receive antenna units by using an example of the $K_1$ target receive antenna units that are multiplexed.

It should be noted that, because a separate linear polarization antenna serves as a receive antenna, a right-handed circular polarization signal and a left-handed circular polarization signal may be received at the same time, but only some signal energy may be lost.

In an embodiment, one or more of the $K_1$ target receive antenna units may include at least one linear polarization antenna.

In an embodiment, a linear polarization antenna in the at least one linear polarization antenna may have a plurality of polarization directions. This is not limited in this embodiment of this application.

In an embodiment, one or more of the $K_1$ target receive antenna units may include at least one vertical polarization antenna and/or at least one horizontal polarization antenna.

Figure 15:
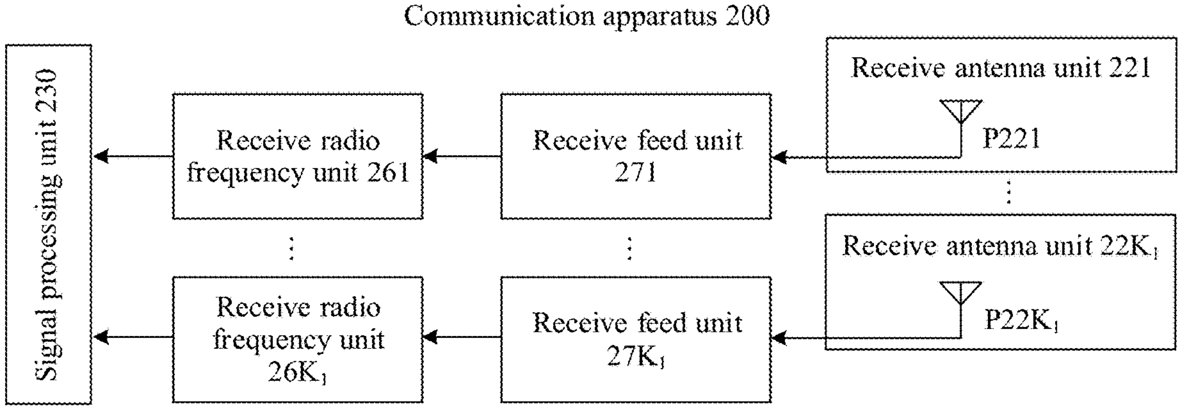
FIG. 15 is still another schematic block diagram of a communication apparatus 200 according to an embodiment of this application.

For example, each of the $K_1$ target receive antenna units, namely, the receive antenna units 221 to 22$K_1$, includes one horizontal polarization antenna, for example, horizontal polarization antennas P221 to P22$K_1$ shown in FIG. 15. It should be noted that FIG. 15 shows only parts related to the $K_1$ target receive antenna units in the communication apparatus 200, and other parts are not shown.

In another embodiment, one or more of the $K_1$ target receive antenna units may include at least one linear polarization antenna combination. The linear polarization antenna combination includes a pair of linear polarization antennas that are orthogonally polarized.

In an embodiment, a linear polarization antenna group in the at least one linear polarization antenna combination may include a pair of linear polarization antennas that are orthogonally polarized in a plurality of manners. This is not limited in this embodiment of this application.

In an embodiment, the linear polarization antenna combination may include a 45° polarization antenna and a −45° polarization antenna.

In another embodiment, the linear polarization antenna combination may include a horizontal polarization antenna and a vertical polarization antenna.

In still another embodiment, one or more of the at least one target receive antenna unit may include at least one linear polarization antenna and at least one linear polarization antenna combination. The linear polarization antenna combination includes a pair of linear polarization antennas that are orthogonally polarized.

For example, each of the $K_1$ target receive antenna units, namely, receive antenna units 221 to 22$K_1$, may include a linear polarization antenna combination. Each linear polarization antenna combination may include a horizontal polarization antenna and a vertical polarization antenna, for example, a linear polarization antenna combination P221 to P22$K_1$ shown in FIG. 16. The linear polarization antenna combination 221 includes a horizontal polarization antenna P221-1 and a vertical polarization antenna P221-2, . . . , and the linear polarization antenna combination 22$K_1$ includes a horizontal polarization antenna P22$K_1$−1 and a vertical polarization antenna P22$K_1$−2. It should be noted that FIG. 16 shows only parts related to the $K_1$ target receive antenna units in the communication apparatus 200, and other parts are not shown.

Figure 16:
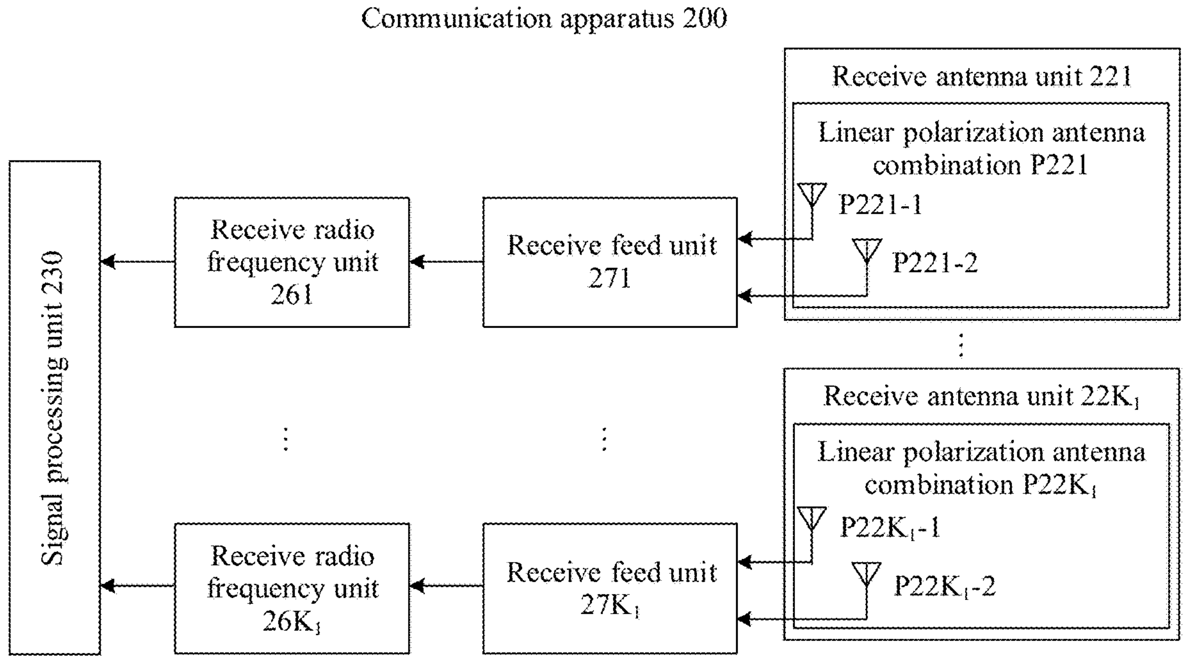
FIG. 16 is still another schematic block diagram of a communication apparatus 200 according to an embodiment of this application.

In an embodiment, as shown in FIG. 16, the receive feed unit 271 may be configured to: receive a horizontal polarization signal from the horizontal polarization antenna P221-1 in the linear polarization antenna combination P221 and a vertical polarization signal from the vertical polarization antenna P221-2 in the linear polarization antenna combination P221; move a phase of the vertical polarization signal forward by 90 degrees relative to a phase of the horizontal polarization signal to obtain the first echo signal; move the phase of the horizontal polarization signal forward by 90 degrees relative to the phase of the vertical polarization signal to obtain the second communication signal corresponding to the at least one first terminal; perform combination processing on the first echo signal and the second communication signal corresponding to the at least one first terminal to obtain a combined signal; and send the combined signal to the receive radio frequency unit 261. Correspondingly, the receive radio frequency unit 261 may be configured to receive the combined signal, and send the combined signal to the signal processing unit 230. Correspondingly, the signal processing unit 230 may be configured to: receive the combined signal; obtain the second communication signal corresponding to the at least one first terminal from the combined signal based on the second subband; and obtain the first echo signal from the combined signal based on the second frequency band.

It should be noted that, in this embodiment of this application, an example in which the receive feed unit 271 moves the phase of the vertical polarization signal forward by 90 degrees relative to the phase of the horizontal polarization signal to obtain the first echo signal (namely, the left-handed circular polarization signal), and moves the phase of the horizontal polarization signal forward by 90 degrees relative to the phase of the vertical polarization signal to obtain the second communication signal (the right-hand circular polarization signal) is used for description. However, this embodiment of this application is not limited thereto.

In an embodiment, the receive feed unit 271 may move the phase of the vertical polarization signal forward by a first angle relative to the phase of the horizontal polarization signal to obtain the first echo signal, and move the phase of the horizontal polarization signal forward by a second angle relative to the phase of the vertical polarization signal to obtain the second communication signal, where the first angle and/or the second angle may fall within a preconfigured angle range, and the angle range includes 90 degrees. Only when the first angle is an angle other than 90 degrees in the angle range, some signal energy may be lost. For example, circular polarization signals may become elliptical polarized signals. For example, an error less than a specific threshold may exist between the angle range and 90 degrees. The error may be caused by a manufacturing process or a difference of manufacturing precision. For another example, the angle range may be 80 degrees to 100 degrees. This is not limited in this embodiment of this application.

It should be noted that, the foregoing paragraph only schematically describes functions of the receive antenna unit 221, the receive feed unit 271, the receive radio frequency unit 261, and the signal processing unit 230. For other functions of the receive antenna unit, the receive feed unit, the receive radio frequency unit, and the signal processing unit in FIG. 16, refer to the foregoing description. To avoid repetition, details are not described herein again.

Figure 17:
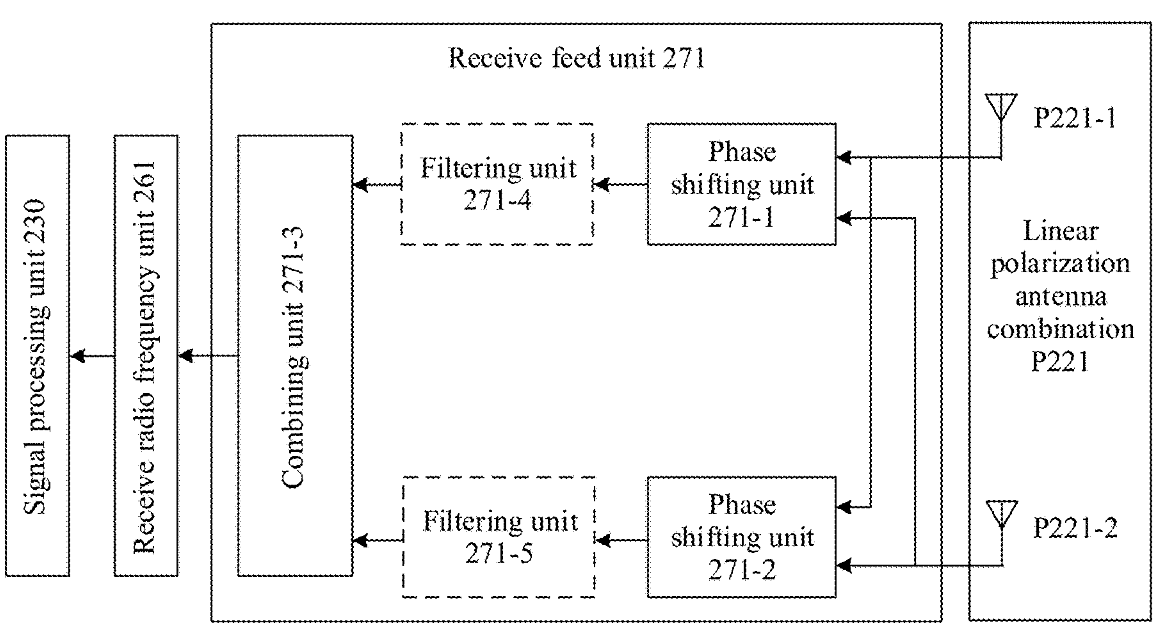
FIG. 17 is still another schematic block diagram of a communication apparatus 200 according to an embodiment of this application.

In an embodiment, FIG. 17 is a schematic block diagram of the receive feed unit 271 in FIG. 16. As shown in FIG. 17, the receive feed unit 271 may include a phase shifting unit 271-1, a phase shifting unit 271-2, and a combining unit 271-3 (other parts are not shown). A first input end of the phase shifting unit 271-1 is connected to the horizontal polarization antenna P221-1. A second input end of the phase shifting unit 271-1 is connected to the vertical polarization antenna P221-2. An output end of the phase shifting unit 271-1 is connected to a first input end of the combining unit 271-3. A first input end of the phase shifting unit 271-2 is connected to the horizontal polarization antenna P221-1. A second input end of the phase shifting unit 271-2 is connected to the vertical polarization antenna P221-2. An output end of the phase shifting unit 271-2 is connected to a second input end of the combining unit 271-3. An output end of the combining unit is connected to an input end of the receive radio frequency unit 261.

The phase shifting unit 271-1 is configured to: move the phase of the vertical polarization signal from the vertical polarization antenna P221-2 forward by 90 degrees relative to the phase of the horizontal polarization signal from the horizontal polarization antenna P221-1 to obtain the first echo signal; and send the first echo signal to the combining unit 271-3.

The phase shifting unit 271-2 is configured to: move the phase of the horizontal polarization signal from the horizontal polarization antenna P221-1 forward by 90 degrees relative to the phase of the vertical polarization signal from the vertical polarization antenna P221-2 to obtain the second communication signal; and send the second communication signal corresponding to the at least one first terminal to the combining unit 271-3.

The combining unit 271-3 is configured to: perform combination processing on the first echo signal from the phase shifting unit 271-1 and the second communication signal that is from the phase shifting unit 271-2 and that corresponds to the at least one first terminal to obtain the combined signal; and send the combined signal to the receive radio frequency unit 261.

In an embodiment, as shown in FIG. 17, the receive feed unit 271 may further include a filtering unit 271-4 and a filtering unit 271-5. The output end of the phase shifting unit 271-1 is connected to the first input end of the combining unit 271-3 through the filtering unit 271-4. The output end of the phase shifting unit 271-2 is connected to the second input end of the combining unit 271-3 through the filtering unit 271-5. The filtering unit 271-4 is configured to perform filtering processing on the first echo signal from the phase shifting unit 271-1. The filtering unit 271-5 is configured to perform filtering processing on the second communication signal that is from the phase shifting unit 271-2 and that corresponds to the at least one first terminal.

It should be noted that, FIG. 17 merely schematically describes a structure and a function of the receive feed unit 271. For a structure and a function of another receive feed unit in FIG. 16, refer to the receive feed unit 271. To avoid repetition, details are not described herein again.

Figure 18:
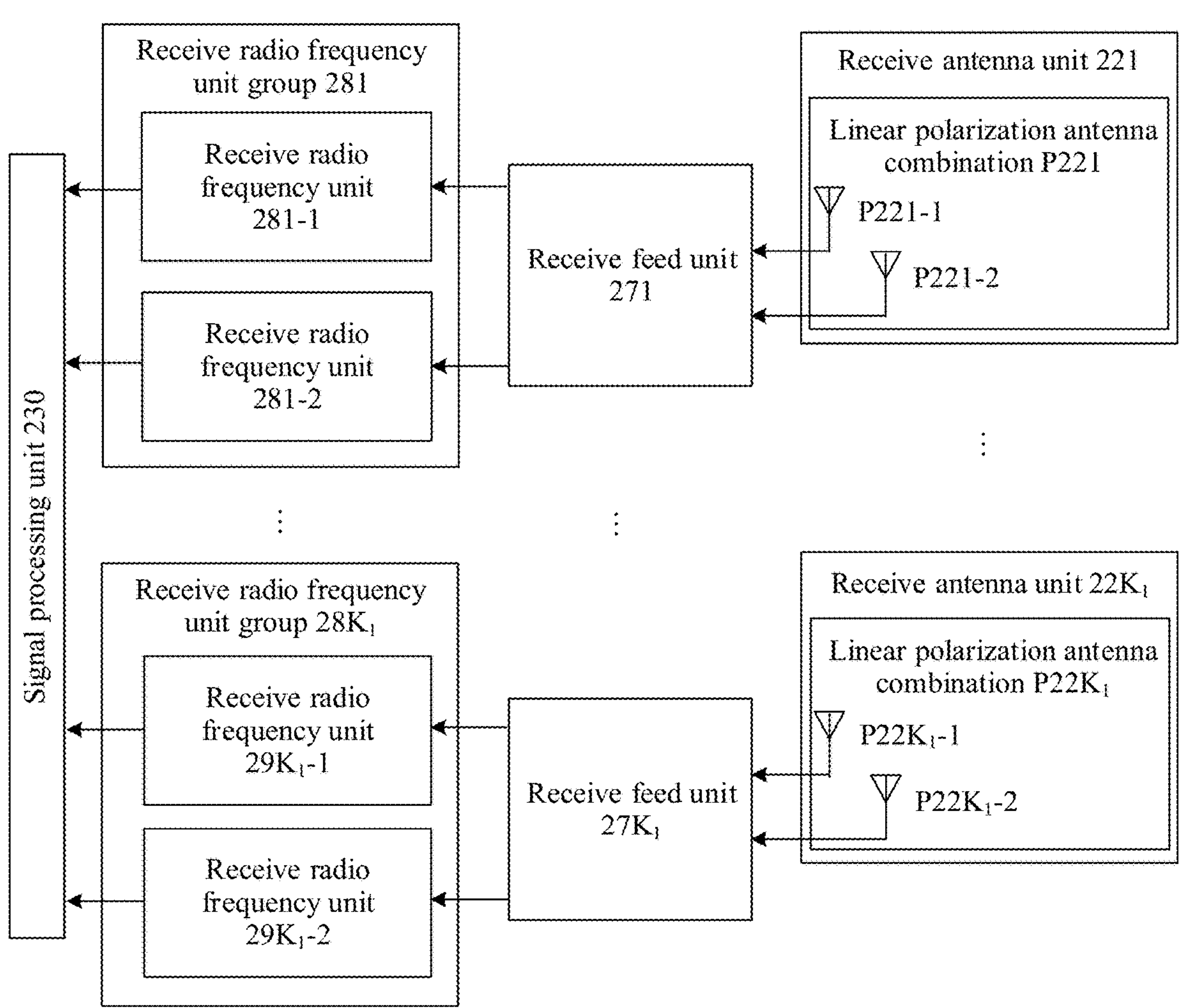
FIG. 18 is still another schematic block diagram of a communication apparatus 200 according to an embodiment of this application.

In an embodiment, the receive radio frequency unit 261 and the receive radio frequency unit 26$K_1$ in FIG. 16 may be replaced with a receive radio frequency unit group 281 and a receive radio frequency unit group 28$K_1$. Each receive radio frequency unit group includes at least two receive radio frequency units. As shown in FIG. 18, the receive radio frequency unit group 281 includes a receive radio frequency unit 281-1 and a receive radio frequency unit 281-2, . . . , and the receive radio frequency unit group 28$K_1$ includes a receive radio frequency unit 28$K_1$-1 and a receive radio frequency unit 28$K_1$-2.

In an embodiment, as shown in FIG. 18, the receive feed unit 271 is configured to: receive a horizontal polarization signal from the horizontal polarization antenna P221-1 in the linear polarization antenna combination P221 and a vertical polarization signal from the vertical polarization antenna P221-2 in the linear polarization antenna combination P221; move a phase of the vertical polarization signal forward by 90 degrees relative to a phase of the horizontal polarization signal to obtain the first echo signal; move the phase of the horizontal polarization signal forward by 90 degrees relative to the phase of the vertical polarization signal to obtain the second communication signal corresponding to the at least one first terminal; send the first echo signal to the receive radio frequency unit 281-1 in the receive radio frequency unit group 281; and send the second communication signal corresponding to the at least one first terminal to the receive radio frequency unit 281-2 in the receive radio frequency unit group 281.

Correspondingly, the receive radio frequency unit 281-1 is configured to receive the first echo signal, and send the first echo signal to the signal processing unit 230. The receive radio frequency unit 281-2 is configured to receive the second communication signal corresponding to the at least one first terminal, and send the second communication signal corresponding to the at least one first terminal to the signal processing unit 230.

Correspondingly, the signal processing unit 230 is configured to receive the first echo signal and the second communication signal corresponding to the at least one first terminal.

It should be noted that, the foregoing paragraph only schematically describes functions of the receive antenna unit 221, the receive feed unit 271, the receive radio frequency unit group 281, and the signal processing unit 230. For other functions of the receive antenna unit, the receive feed unit, the receive radio frequency unit group, and the signal processing unit in FIG. 18, refer to the foregoing description. To avoid repetition, details are not described herein again.

Figure 19:
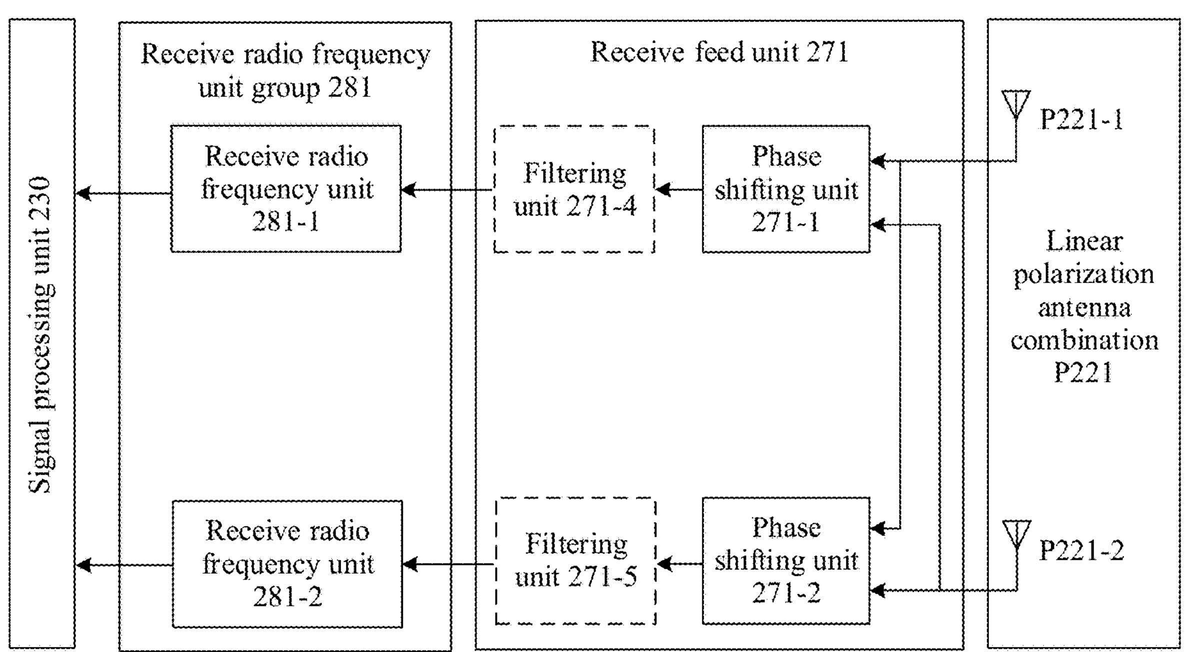
FIG. 19 is another schematic block diagram of a communication apparatus 200 according to an embodiment of this application.

In an embodiment, FIG. 19 is a schematic block diagram of the receive feed unit 271 in FIG. 18. A difference between the receive feed unit 271 shown in FIG. 19 and the receive feed unit 271 in FIG. 17 lies in that the receive feed unit 271 does not need the combining unit 271-3 (other parts are not shown). In other words, as shown in FIG. 19, an output end of the phase shifting unit 271-1 (or an output end of the filtering unit 271-4) is connected to an input end of the receive radio frequency unit 281-1, and an output end of the phase shifting unit 271-2 (or an output end of the filtering unit 271-5) is connected to an input end of the receive radio frequency unit 281-2.

It should be noted that, FIG. 19 merely schematically describes a structure and a function of the receive feed unit 271. For a structure and a function of another receive feed unit in FIG. 18, refer to the receive feed unit 271. To avoid repetition, details are not described herein again.

According to the communication apparatus 200 provided in this embodiment of this application, the receive feed unit 271 shown in FIG. 19 is used, so that circuit complexity of the receive feed unit and processing complexity of the signal processing unit can be reduced; and the receive feed unit 271 shown in FIG. 17 is used, so that a quantity of receive radio frequency units can be reduced. This reduces costs and overheads.

In an embodiment, a function implemented by the receive radio frequency unit and/or the receive feed unit in this embodiment of this application may be implemented by hardware or software. This is not limited in this embodiment of this application.

In an embodiment, the receive radio frequency unit in this embodiment of this application may include a receive radio frequency circuit. The receive radio frequency circuit is configured to implement a function of the receive radio frequency unit. It should be noted that, for a structure of the receive radio frequency circuit, refer to a structure of a circuit having a similar function in the conventional technology.

In an embodiment, the receive feed unit in this embodiment of this application may include a receive feed circuit. The receive feed circuit is configured to implement a function of the receive feed unit. It should be noted that, for a structure of the receive feed circuit, refer to a structure of a circuit having a similar function in the conventional technology.

In an embodiment, when the communication apparatus 200 provided in this embodiment of this application is integrated into an RSU, an embodiment of this application further provides an RSU.

An embodiment of this application further provides an RSU. The RSU may be the communication apparatus 200 in the foregoing embodiment, or the RSU includes the communication apparatus 200 in the foregoing embodiment.

An embodiment of this application further provides a communication system. The communication system includes at least one terminal and an RSU. The RSU may be the communication apparatus 200 in the foregoing embodiment, or the RSU includes the communication apparatus 200 in the foregoing embodiment.

An embodiment of this application further provides a communication method. The method may include: controlling at least one transmit antenna unit and at least one receive antenna unit to communicate with at least one first terminal on a first frequency band; controlling at least one target transmit antenna unit to send a radar signal on a second frequency band; and controlling at least one target receive antenna unit to receive a first echo signal on the second frequency band. The first echo signal includes an echo signal corresponding to at least one target. The at least one transmit antenna unit includes the at least one target transmit antenna unit. The at least one receive antenna unit includes the at least one target receive antenna unit. The first frequency band and the second frequency band do not overlap.

An embodiment of this application further provides a signal processing apparatus. The apparatus includes a processing unit. The processing unit is configured to: control at least one transmit antenna unit and at least one receive antenna unit to communicate with at least one first terminal on a first frequency band; control at least one target transmit antenna unit to send a radar signal on a second frequency band; and control at least one target receive antenna unit to receive a first echo signal of the radar signal on the second frequency band. The first echo signal includes an echo signal corresponding to at least one target. The at least one transmit antenna unit includes the at least one target transmit antenna unit. The at least one receive antenna unit includes the at least one target receive antenna unit. The first frequency band and the second frequency band do not overlap. Further in an embodiment, the signal processing unit includes the at least one transmit antenna unit and the at least one receive antenna unit.

Based on the foregoing communication method or signal processing apparatus:

In an embodiment, one or more of the at least one transmit antenna unit include at least one right-handed circular polarization antenna.

In an embodiment, one or more of the at least one target receive antenna unit include at least one linear polarization antenna.

In an embodiment, the at least one linear polarization antenna includes at least one horizontal polarization antenna and/or at least one vertical polarization antenna.

In an embodiment, one or more of the at least one target receive antenna unit include at least one linear polarization antenna combination. The linear polarization antenna combination includes a pair of linear polarization antennas that are orthogonally polarized.

In an embodiment, the linear polarization antenna combination includes a horizontal polarization antenna and a vertical polarization antenna.

In an embodiment, the first frequency band includes a first subband and a second subband. The first subband and the second subband do not overlap. The controlling at least one transmit antenna unit and at least one receive antenna unit to communicate with at least one first terminal on a first frequency band includes: controlling the at least one transmit antenna unit to send a first communication signal to the at least one first terminal on the first subband; and/or controlling the at least one receive antenna unit to receive a second communication signal from the at least one first terminal on the second subband.

In an embodiment, a guard band is included between at least two of the first subband, the second subband, and the second frequency band.

In an embodiment, a quantity of the at least one transmit antenna unit is greater than 1, and a quantity of the at least one target transmit antenna unit is less than the quantity of the at least one transmit antenna unit; and/or a quantity of the at least one receive antenna unit is greater than 1, and a quantity of the at least one target receive antenna unit is less than the quantity of the at least one receive antenna unit.

In an embodiment, the at least one target includes at least one second terminal. The at least one second terminal includes the at least one first terminal.

An embodiment of this application further provides a signal processing apparatus. The apparatus includes at least one communication interface and at least one processor. The at least one communication interface is configured to communicate with at least one transmit antenna unit and at least one receive antenna unit. When executing program code or instructions, the at least one processor implements the communication method described in the foregoing method embodiments. In an embodiment, the signal processing apparatus described in this paragraph may be a chip apparatus or an integrated circuit in the communication apparatus 200 in this embodiment of this application.

In an embodiment, the signal processing apparatus may further include at least one memory. The storage area is configured to store the program code or the instructions.

An embodiment of this application further provides a computer-readable storage medium, configured to store a computer program. The computer program includes instructions used to implement the communication method described in the foregoing method embodiments.

An embodiment of this application further provides a computer program product including instructions. When the computer program product runs on a computer, the computer is enabled to implement the communication method described in the foregoing method embodiments.

A person of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

In the several embodiments provided in this application, it should be understood that the disclosed system and apparatus may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, functional units in the embodiments of this application may be integrated into one processing unit, each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the conventional technology, or a part of the technical solutions may be implemented in a form of a software product. The computer software product is stored in a storage medium, and includes several instructions for indicating a computer device (which may be a personal computer, a server, or a network device) to perform all or a part of the steps of the methods described in embodiments of this application. The foregoing storage medium or memory includes: any medium that can store program code, such as a USB flash drive, a removable hard disk, a read-only memory (ROM), a random access memory (RAM), a magnetic disk, or an optical disc.

The foregoing descriptions are merely embodiments of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A communication apparatus of an electronic toll collection (ETC) system, comprising:

at least one transmit antenna;

at least one receive antenna;

and a signal processor separately connected to the at least one transmit antenna and the at least one receive antenna, and configured to:

control the at least one transmit antenna and the at least one receive antenna to communicate with at least one first terminal on a first frequency band that comprises a first subband and a second subband, wherein the first subband and the second subband do not overlap;

send a first communication signal to the at least one first terminal on the first subband through the at least one transmit antenna; and control at least one target transmit antenna to send a radar signal on a second frequency band, and control at least one target receive antenna to receive a first echo signal of the radar signal on the second frequency band, wherein the first echo signal comprises an echo signal corresponding to at least one target, the at least one transmit antenna comprises the at least one target transmit antenna, the at least one receive antenna comprises the at least one target receive antenna, the first frequency band and the second frequency band do not overlap, and a bandwidth of the radar signal is greater than a bandwidth of the first communication signal;

wherein the communication apparatus performs tracking, positioning, and speed measurement on the at least one first terminal based on the first echo signal.

2. The communication apparatus according to claim 1, wherein one or more of the at least one transmit antenna comprise at least one right-handed circular polarization antenna.

3. The communication apparatus according to claim 1, wherein one or more of the at least one target receive antenna comprise at least one linear polarization antenna.

4. The communication apparatus according to claim 3, wherein the at least one linear polarization antenna comprises at least one horizontal polarization antenna or at least one vertical polarization antenna.

5. The communication apparatus according to claim 1, wherein one or more of the at least one target receive antenna comprise at least one linear polarization antenna combination that comprises a pair of linear polarization antennas that are orthogonally polarized.

6. The communication apparatus according to claim 5, wherein the at least one linear polarization antenna combination comprises a horizontal polarization antenna and a vertical polarization antenna.

7. The communication apparatus according to claim 1, wherein the signal processor is further configured to:

receive a second communication signal from the at least one first terminal on the second subband through the at least one receive antenna, wherein the bandwidth of the radar signal is greater than a bandwidth of the second communication signal.

8. The communication apparatus according to claim 7, further comprising:

at least one receive radio frequency unit; and at least one receive feed unit;

wherein the at least one target receive antenna, the at least one receive feed unit, and the at least one receive radio frequency unit correspond to each other, the at least one target receive antenna is connected to an input end of the at least one receive feed unit, an output end of the at least one receive feed unit is connected to an input end of the at least one receive radio frequency unit, and an output end of the at least one receive radio frequency unit is connected to the signal processor.

9. The communication apparatus according to claim 8, wherein each of the at least one target receive antenna comprises at least one linear polarization antenna combination that comprises a horizontal polarization antenna and a vertical polarization antenna;

the at least one receive feed unit is configured to:

receive a horizontal polarization signal from a horizontal polarization antenna in the target receive antenna corresponding to the receive feed unit and a vertical polarization signal from a vertical polarization antenna in the target receive antenna corresponding to the receive feed unit;

move a phase of the vertical polarization signal forward by 90 degrees relative to a phase of the horizontal polarization signal to obtain the first echo signal;

move the phase of the horizontal polarization signal forward by 90 degrees relative to the phase of the vertical polarization signal to obtain the second communication signal;

perform combination processing on the first echo signal and the second communication signal to obtain a combined signal; and send the combined signal to the receive radio frequency unit corresponding to the receive feed unit;

the receive radio frequency unit corresponding to the receive feed unit is configured to receive the combined signal, and send the combined signal to the signal processor; and the signal processor is further configured to:

receive the combined signal;

obtain the second communication signal from the combined signal based on the second subband; and obtain the first echo signal from the combined signal based on the second frequency band.

10. The communication apparatus according to claim 7, further comprising:

at least one receive radio frequency unit group; and at least one receive feed unit;

wherein the at least one target receive antenna, the at least one receive feed unit, and the at least one receive radio frequency unit group correspond to each other, the at least one target receive antenna is connected to an input end of the at least one receive feed unit, an output end of the at least one receive feed unit is connected to an input end of the at least one receive radio frequency unit group, an output end of the at least one receive radio frequency unit group is connected to the signal processor, and the receive radio frequency unit group comprises a first receive radio frequency unit and a second receive radio frequency unit.

11. The communication apparatus according to claim 10, wherein each of the at least one target receive antenna comprises at least one linear polarization antenna combination that comprises a horizontal polarization antenna and a vertical polarization antenna;

the at least one receive feed unit is configured to:

receive a horizontal polarization signal from the horizontal polarization antenna and a vertical polarization signal from the vertical polarization antenna;

move a phase of the vertical polarization signal forward by 90 degrees relative to a phase of the horizontal polarization signal to obtain the first echo signal;

move the phase of the horizontal polarization signal forward by 90 degrees relative to the phase of the vertical polarization signal to obtain the second communication signal;

send the first echo signal to the first receive radio frequency unit in the receive radio frequency unit group corresponding to the receive feed unit; and send the second communication signal to the second receive radio frequency unit in the receive radio frequency unit group corresponding to the receive feed unit;

the first receive radio frequency unit in the receive radio frequency unit group corresponding to the receive feed unit is configured to receive the first echo signal from the receive feed unit, and send the first echo signal to the signal processor; and the second receive radio frequency unit in the receive radio frequency unit group corresponding to the receive feed unit is configured to receive the second communication signal from the receive feed unit, and send the second communication signal to the signal processor.

12. The communication apparatus according to claim 7, wherein a guard band is comprised between at least two of: the first subband, the second subband, and the second frequency band.

13. The communication apparatus according to claim 1, wherein a quantity of the at least one transmit antenna is greater than 1, and a quantity of the at least one target transmit antenna is less than the quantity of the at least one transmit antenna; or a quantity of the at least one receive antenna is greater than 1, and a quantity of the at least one target receive antenna is less than the quantity of the at least one receive antenna.

14. The communication apparatus according to claim 1, wherein the at least one target comprises at least one second terminal that comprises the at least one first terminal.

15. A communication method for an electronic toll collection (ETC) system, the method comprising:

controlling at least one transmit antenna and at least one receive antenna to communicate with at least one first terminal on a first frequency band that comprises a first subband and a second subband, wherein the first subband and the second subband do not overlap;

sending a first communication signal to the at least one first terminal on the first subband through the at least one transmit antenna;

controlling at least one target transmit antenna to send a radar signal on a second frequency band, and controlling at least one target receive antenna to receive a first echo signal of the radar signal on the second frequency band, wherein the first echo signal comprises an echo signal corresponding to at least one target, the at least one transmit antenna comprises the at least one target transmit antenna, the at least one receive antenna comprises the at least one target receive antenna, the first frequency band and the second frequency band do not overlap, and a bandwidth of the radar signal is greater than a bandwidth of the first communication signal; and performing tracking, positioning, and speed measurement on the at least one first terminal based on the first echo signal.

16. The communication method according to claim 15, wherein one or more of the at least one transmit antenna comprise at least one right-handed circular polarization antenna.

17. The communication method according to claim 15, wherein one or more of the at least one target receive antenna comprise at least one linear polarization antenna.

18. The communication method according to claim 17, wherein the at least one linear polarization antenna comprises at least one horizontal polarization antenna or at least one vertical polarization antenna.

19. The communication method according to claim 15, wherein one or more of the at least one target receive antenna comprise at least one linear polarization antenna combination that comprises a pair of linear polarization antennas that are orthogonally polarized.

20. The communication method according to claim 19, wherein the linear polarization antenna combination comprises a horizontal polarization antenna and a vertical polarization antenna.

* * * * *